(12) United States Patent
Li et al.

(10) Patent No.: US 8,730,409 B2
(45) Date of Patent: *May 20, 2014

(54) PROJECTION SYSTEM AND METHOD OF CURVED FILM

(75) Inventors: Ming Li, Shenzhen (CN); Zhigang Rong, Shenzhen (CN); Liang Ding, Shenzhen (CN); Tao Cui, Shenzhen (CN); Caixia Huo, Shenzhen (CN)

(73) Assignee: Fantawild Digital Film Inc., Shenzhen, Guangdong (CN)

( * ) Notice: Subject to any disclaimer, the term of this patent is extended or adjusted under 35 U.S.C. 154(b) by 126 days.

This patent is subject to a terminal disclaimer.

(21) Appl. No.: 13/385,553

(22) Filed: Feb. 24, 2012

(65) Prior Publication Data

US 2012/0212683 A1 Aug. 23, 2012

Related U.S. Application Data

(63) Continuation of application No. 11/645,547, filed on Dec. 27, 2006, now Pat. No. 8,154,586.

(30) Foreign Application Priority Data

Jan. 5, 2006 (CN) .......................... 2006 1 0032763

(51) Int. Cl.
*H04N 5/64* (2006.01)
*H04N 9/31* (2006.01)

(52) U.S. Cl.
USPC ................. 348/744; 348/51; 348/42; 348/39; 348/36; 348/47; 348/48; 348/58; 348/96; 348/97; 345/582

(58) Field of Classification Search
USPC ......... 348/744, 51, 42, 39, 47, 48, 58, 96, 97, 348/36; 345/582
See application file for complete search history.

(56) References Cited

U.S. PATENT DOCUMENTS

| | | | |
|---|---|---|---|
| 7,084,904 B2 * | 8/2006 | Liu et al. ..................... | 348/218.1 |
| 7,149,367 B2 * | 12/2006 | Cutler ............................ | 382/284 |
| 7,268,917 B2 * | 9/2007 | Watanabe et al. .............. | 358/1.9 |
| 7,327,899 B2 * | 2/2008 | Liu et al. ....................... | 382/276 |
| 7,646,404 B2 * | 1/2010 | Liu et al. .................... | 348/218.1 |
| 2004/0012705 A1 * | 1/2004 | Levy .............................. | 348/335 |
| 2004/0061787 A1 * | 4/2004 | Liu et al. ................... | 348/218.1 |

* cited by examiner

*Primary Examiner* — Jefferey Harold
*Assistant Examiner* — Mustafizur Rahman
(74) *Attorney, Agent, or Firm* — Raymond Y. Chan; David and Raymond Patent Firm

(57) ABSTRACT

The invention involves a sort of curved film projection system, including a rendering surface, a projection screen, a real scene rendering model of image system, a rendering model of projection system that renders the projection the image rendered by the rendering model of image system on the rendering surface, and projecting devices that projects the image finally rendered by the rendering model of projection system onto the projection screen through optical lens. The viewing direction and angle from observer's eyes to the rendering surface is consistent with that to the projection screen: The image system rendering model can be reversible on optical path with the projection system rendering model. The curved film projection system not only reduces the rendering cost, but also produces lifelike experience for audience.

14 Claims, 21 Drawing Sheets

Node A Diagram

Projection System Unit    Camera Unit

PROJECTION SYSTEM AND METHOD OF CURVED FILM

CROSS REFERENCE OF RELATED APPLICATION

This is a Continuation application that claims the benefit of priority under 35 U.S.C. §119 to a non-provisional application, application Ser. No. 11/645,547, filed Dec. 27, 2006 now U.S. Pat. No. 8,154,586.

FIELD OF THE INVENTION

The invention involves digital film technique, to be specific, a sort of optics technique together with computer graph technique, recorded in digital or some other regular ways, so as to generate a device system that can really restore 3D effects by projecting image on curved screen.

BACKGROUND OF THE INVENTION 3D movie brings forward a lifelike experience. As stated by the pioneering 3D movies principle, when people watch with eyes, distance and 3D effect are engendered by eye angel, thus when two eyes aim at same object, the visual angle is different. The closer the object, the more different the view filed of two eyes, vice versa, the less; and it is almost paralleled looking into far distance. 3D movie principle namely two cameras shoot at the same time simulating human eyes, projecting to the same screen in synchronization, therefore 3d effect is produced with different views of the two eyes separated by polarized glasses.

The principle to make 3d movie by adopting curved screen: a few parameters need to be explained concerning optical characters of human eyes: horizontal coverage of human eye is around 150°, vertical coverage is around 55°. The best viewing angle is: around 10° up and down the viewing field, 10° for horizontal direction. The distance of the two pupils is 55-74 mm. Viewing angle around 55° is similar with human eyes. Perspective effect of projected image at this angle conforms with that of human eyes, real and natural. FIGS. 1 & 2 are viewing field and viewing angle diagram of human eyes. Eyes will move around with head when looking around, as shown on FIGS. 3 & 4. The existing 3D movie production technique normally simulates spherical or curved surface with multiple planes, wherein the produced image is not seamless, smooth or continuous and can only be applicable to such simple geometrical models as sphere and conicoid. If applicable to 3d model, the parallax can not turn to be smooth and continuous. The curved surface can also be simulated with the optical ray tracing method under present technique. But the rendering cost is very high.

SUMMARY OF THE INVENTION

The purpose of the invention is to put forward a kind of curved film projection system to improve the existing technique.

Technical solution the invention adopts aims to create a sort of curved film projection system, comprising
a rendering surface,
a projection screen,
a real scene rendering model of image system,
a rendering model of projection system that renders the projection the image rendered by the rendering model of image system on the rendering surface, and
a projecting device that projects the image finally rendered by the rendering model of projection system onto the projection screen through optical lens.

The said projection screen is regarded as the first surface or part of the first surface. The said rendering surface is regarded as the second surface or part of the second surface. The first surface is behind the said second surface, watching from observer's eyes to projection screen. The viewing direction and angle from observer's eyes to the rendering surface is consistent with that to the projection screen. The viewing direction and angle from observer's eyes to the rendering surface is consistent with that to the screen; the said image system rendering model can be reversible with the said projection system model. The said rendered real scene by projection system rendering model, projected to the second surface and then to the projection screen through projecting device, exactly restore the distorted image produced by the image system rendering model.

The rendering models of both image system and projection system respectively comprise cameras and projectors, the view directions of which are consistent, two centers coincide, but the optical paths are reversible.

The curved film projection system is characterized that the image system rendering model comprises up-and-down M-layer digital cameras and each layer contains N cameras.

In the preferred embodiment, the said M is 3, the said N is 7, the said image system rendering model contains 21 single digital cameras. The angle of the horizontal view field of each digital camera is 25.7142857°, and the angle of vertical view field is 60°. The viewing direction of all digital cameras follow the same direction as that of the divided viewing field. Horizontal viewing direction of each camera is 12.85710, 38.5714°, 64.2857° 90°, 115.7143°, 141.4286° and 167.1429° respectively.

In another alternate embodiment, the said M is 3, the said N is 3, the said image system rendering model contains 9 single digital cameras. The angle of horizontal view field of each camera is 60°. The angle of vertical view field is 60°. Viewing direction of all digital cameras follow the direction of divided viewing field. The horizontal viewing direction of each single digital camera in each layer is 30°, 90° and 150° respectively.

The projection system rendering model comprises upper and lower M-layer digital cameras, each layer of which contains N single digital projectors.

In a preferred embodiment, the said M is 3, the said N is 7, the said projection system rendering model contains 21 single digital cameras. The angle of horizontal view field of each projection system rendering model is 25.7142857°, and the angle of vertical view field is 60°. The viewing directions of all digital projectors are the same as divided viewing field. Horizontal viewing direction of each projector in each layer is 12.8571°, 38.5714°, 64.2857°, 90°, 115.7143°, 141.4286° and 167.1429° respectively.

In another alternate embodiment, the said M is 3, the said N is 3, and the said projection system rendering model contains 9 cameras. The angle of horizontal view field of each projector is 60°. The angle of vertical view filed is also 60°. Viewing direction of all digital projectors are the same as that of divided viewing field. The horizontal viewing direction of each digital projector in each layer is 30°, 90° and 150° respectively.

The said first surface of the curved film projection system is a curved surface, a plane surface, or a combination of plane and curved surface. The said second surface is sphere or conicoid.

Set a spherical surface, take the vertical section of the sphere, which is round in shape, the said vertical axis of the section is OZ, divide horizontal viewing field 0-180° of the section into n parts, indicate the n viewing directions with radial ° A1-0An, divide the said semicircle diameter evenly into n parts with section points as PO, P1, P2 ... Pn−1 and Pn, draw n lines as L1, L2, L3 ... Ln−1 and Ln paralleled to OZ axis cross the said n section points, then followed with in turn M1, intersection point of ° A1 and L1, M2, intersection point of 0A2 and L2, M3, intersection point of 0A3 and L3 ... Mn−1, intersection point of 0An−1 and Ln−1, Mn, intersection point of 0An and Ln, connect MO, Mi, M2 ... Mn−1 and Mn to get a curve K, rotate curve K 360° around OZ axis to get curved surface B, the said second surface is curved surface B.

The invention adopts a technical solution of curved film projection method which is characterized in following steps:
  A1) the rendering model of image system rendering the real scene.
  A2) the rendering model of projection system rendering the projection of image rendered by the image system rendering model on the rendering surface.
  A3) the projecting device projecting the finally rendered image of the rendering model of projection system onto the projection screen via the optical lens.

The rendering as mentioned in above A2) adopts orthogonal rendering.

The application of curved film projection system avails as follows: the adoption of spherical rendering model based on optical path reversibility principle vividly restores ubiety of space project; the image turns to be totally seamless, smooth and continuous that can exactly restore spherical surface and conicoid; the parallax could be made smooth and continuous under 3D mode by application of curved surface that either can be or not be described in mathematic model, which bring the audience a lifelike experience. The rendering cost could be decreased considerably accordingly by introducing a simplified digital optical lens model into this curved film projection system.

BRIEF DESCRIPTION OF THE DRAWINGS

The features and advantages of the present invention will become apparent form the following detailed description of the invention when read with the accompanying drawings in which.

DETAILED DESCRIPTION OF THE INVENTION

By adopting optical paths reversibility, to realize restoration of space object ubiety through spherical rendering model, the produced image of the invention turns to be totally seamless, smooth and continuous, which is applicable to spherical surface, conicoid, or curved surface that can either be described or not in mathematic model. The parallax can be made smooth and continuous in 3D mode. Curved surface can also be simulated with calculation of optical ray tracing method, which is costly, comparatively simplified model is substantially savable.

Figure 1:
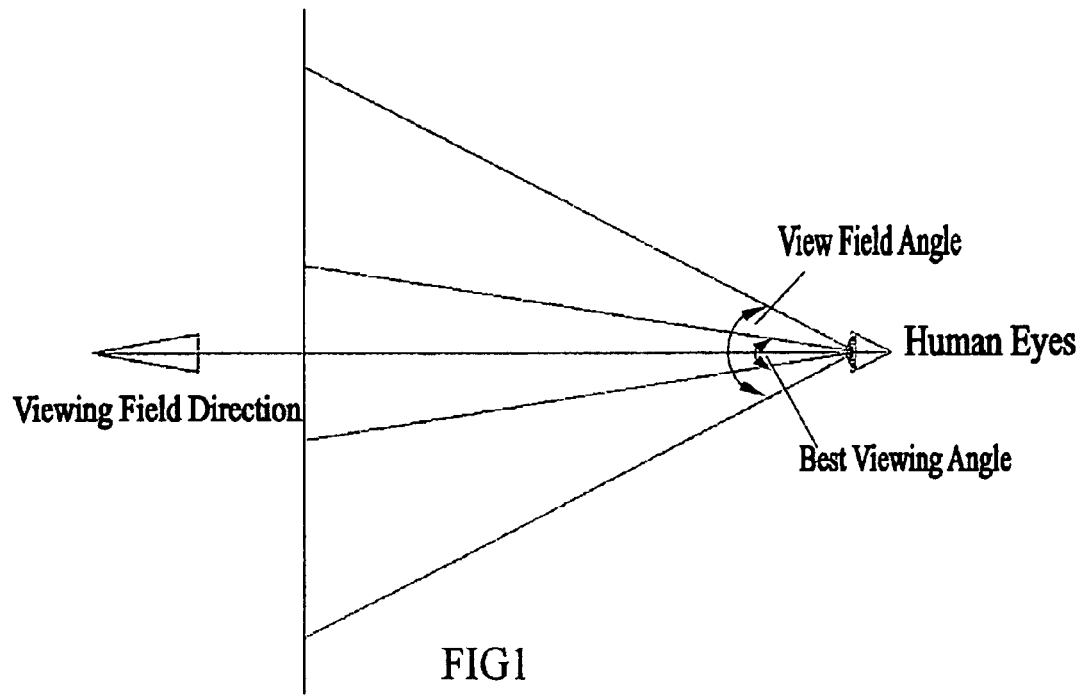
FIG. 1 is a side view of viewing field and visual angle of human eyes.
Figure 2:
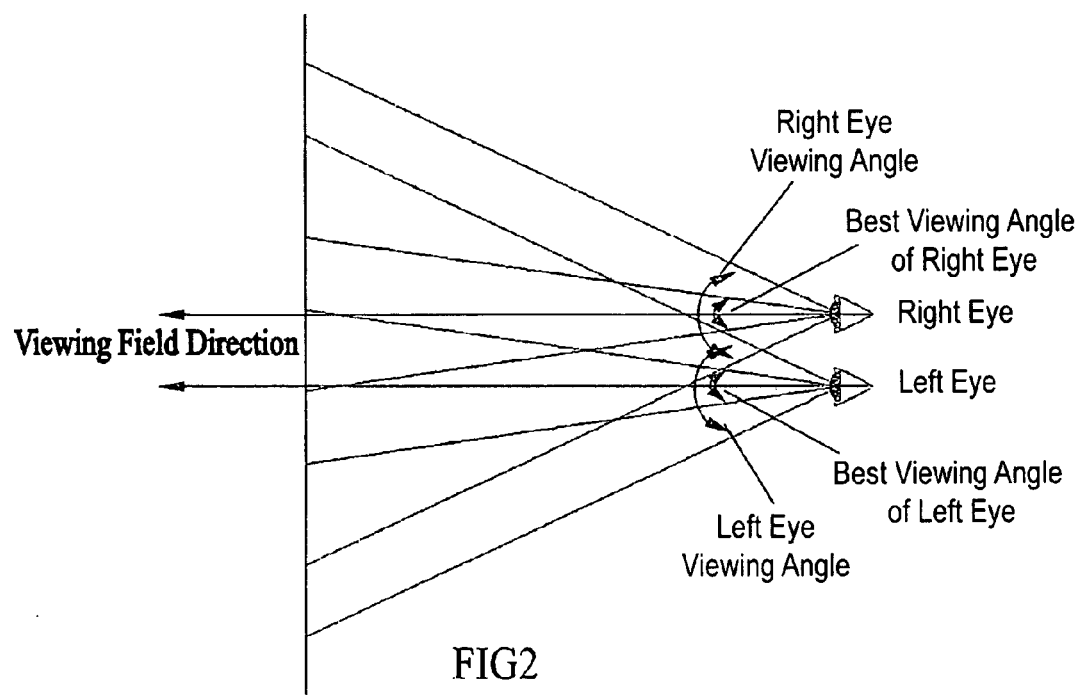
FIG. 2 is a plane view of viewing filed and visual angel of human eyes.
Figure 3:
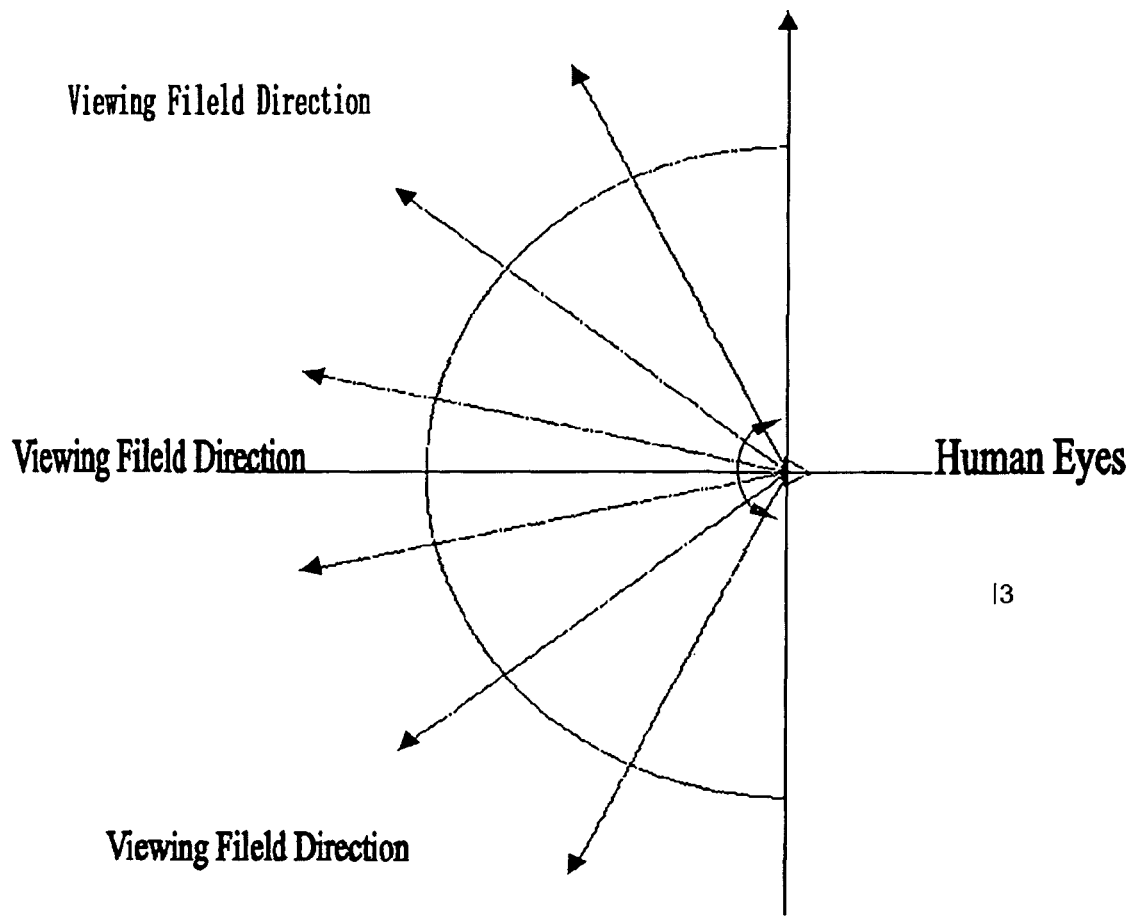
FIG. 3 is a schematic diagram of the scene viewed when human eyes look up and down.
Figure 4:
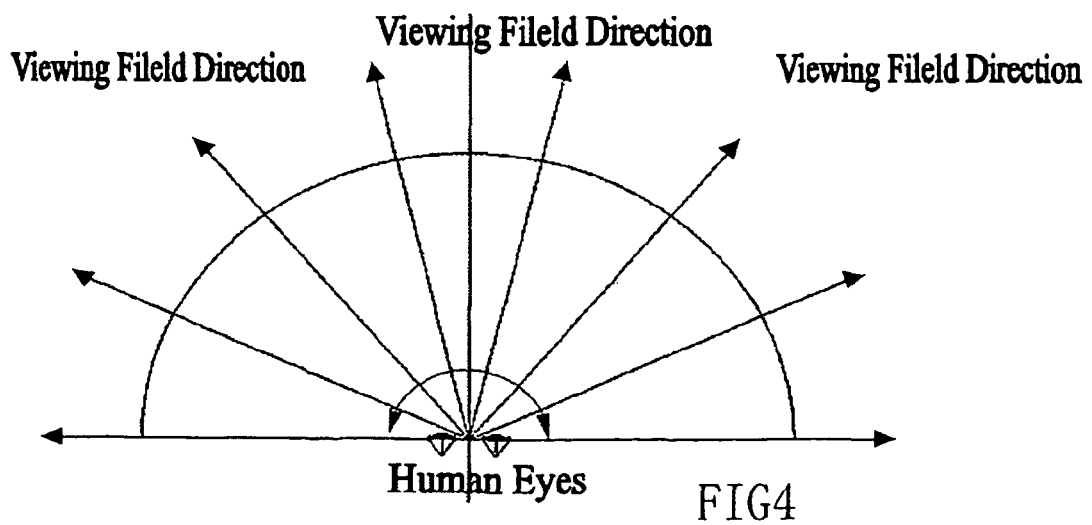
FIG. 4 is a schematic diagram of the scene viewed when human eyes look left and right.
Figure 5:
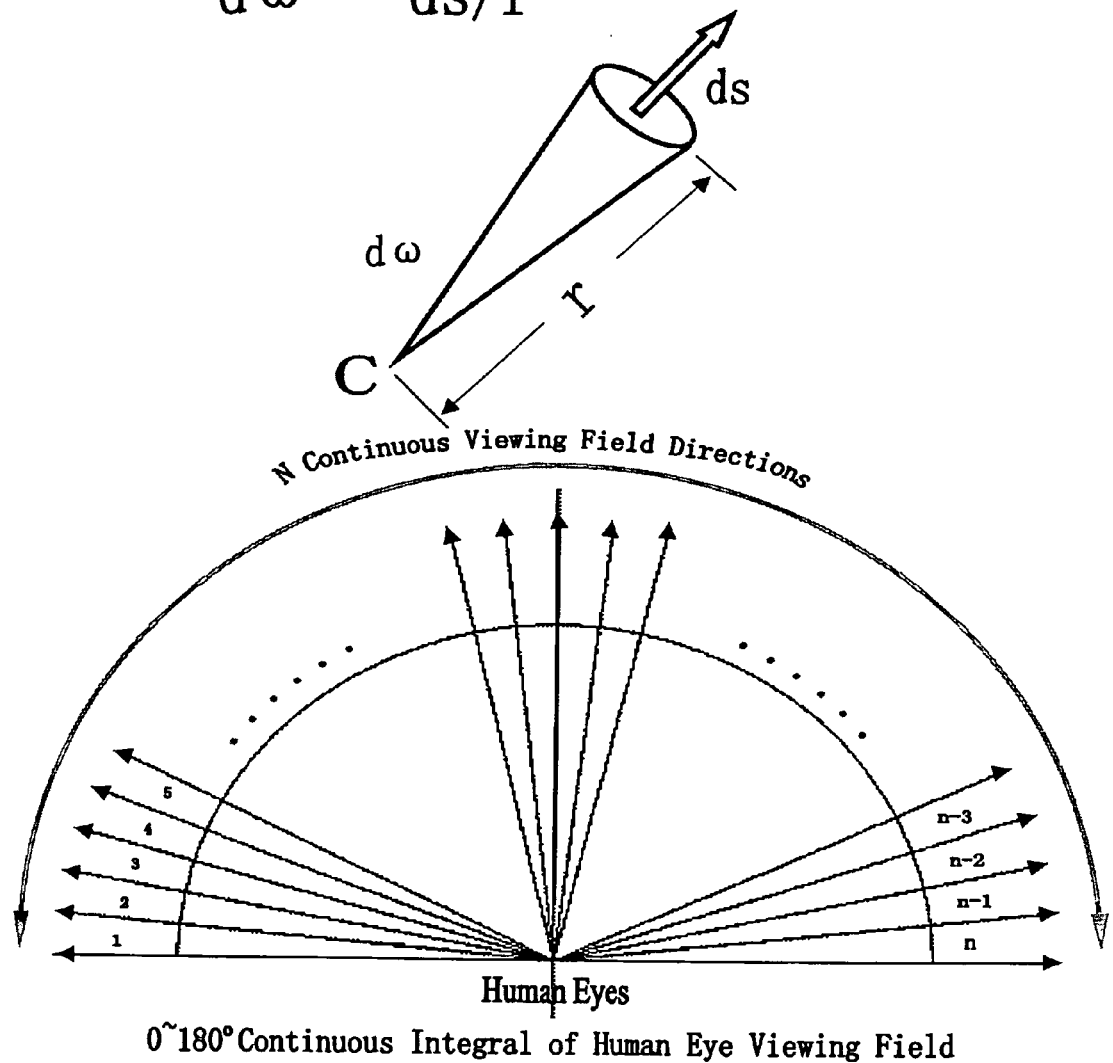
FIG. 5 is a schematic diagram of 0-180° continuous integral of viewing field 0-180°
Figure 6:
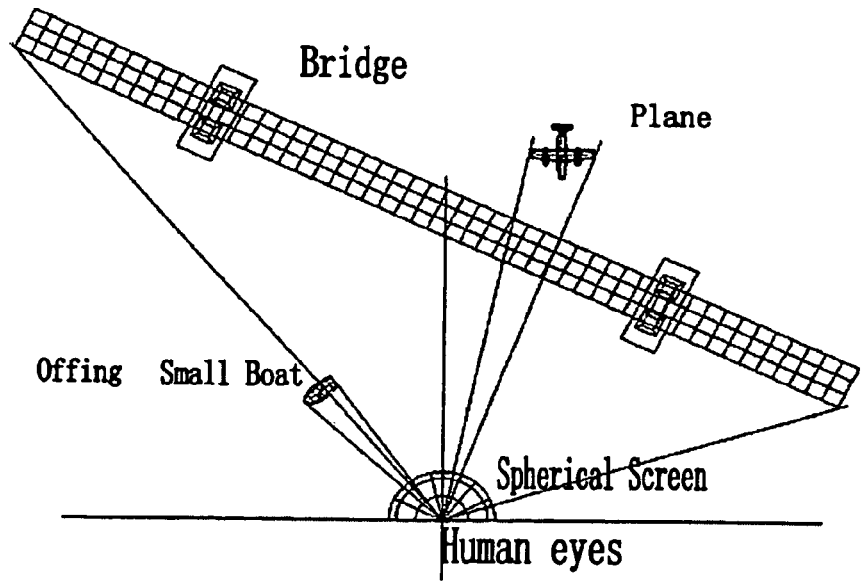
FIG. 6 is a diorama mapped plane on spherical surface from ahead
Figure 7:
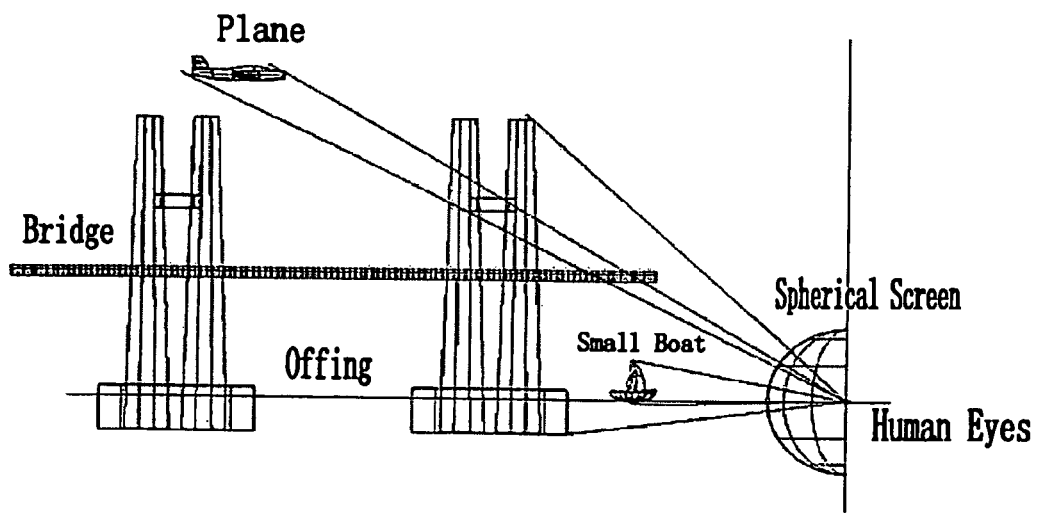
FIG. 7 is a diorama mapped side elevation on spherical surface from ahead
Figure 8:
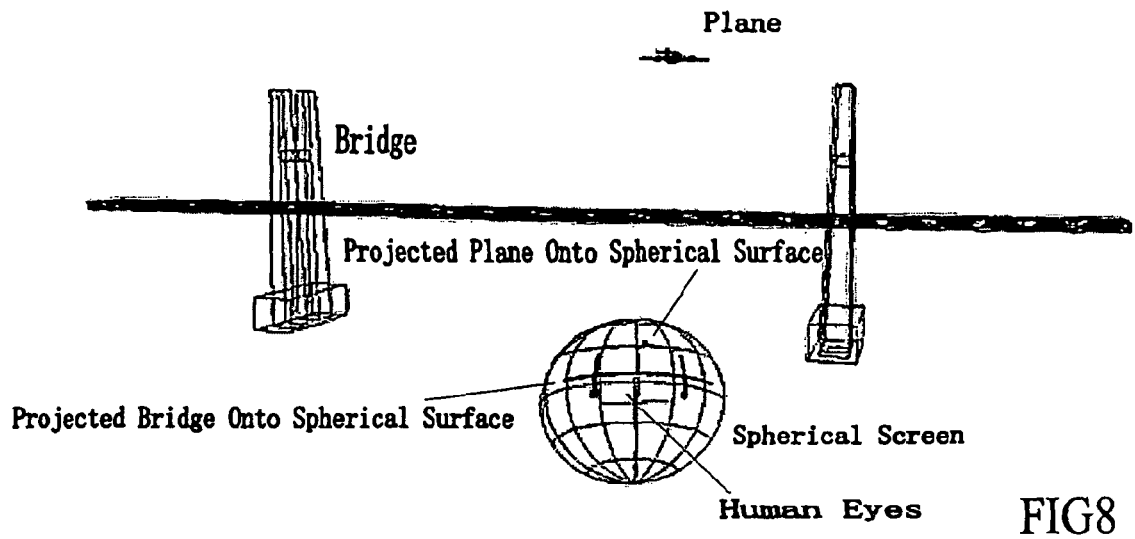
FIG. 8 is a mapped perspective on spherical surface from ahead

Suppose human eyes at the same level, set a simple analogue as shown on FIG. 5 to simulate the view range when human eyes look around. As indicated, if C is supposed to be a source point, line out in some direction an infinitesimal solid angel dco, corresponding to ds, a section of the spherical surface, the spherical radius as r, then the following relation is brought up: dco=ds/r², the solid of entire space co=4n sterad, is the continuous integral of human eye viewing field. In order to represent the real screen ahead of eyes, suppose all real objects has a projection on spherical surface with eyes as the center of the circle, when image recorded at eyes position, then projected to the same spherical surface, a real scene can be experienced when looking from the center of the sphere as shown on FIGS. 6,7 and 8. As indicated on FIGS. 6 and 7, if such space objects as offing, ship, plane and bridge have a projection on the spherical surface with eye as the center of the circle, a real scene can be felt at the correct location from the projection. The basic principle of the invention is to record the scene viewed from audience eyes location, view field and viewing angle, and then project to one section of spherical surface with eyes as center of the circle. Audience can feel the viewed scene restored when watching from effective position. The projected image may be actually shot, but the simulation limited by equipment conditions (such as hoist, bracket, gliding rail or any other walking equipments), what can be caught are only browed scenes or flying scenes; restricted with browse equipments or flight safety, many extreme shrilling pictures cannot be caught. So this is an option for low cost production.

Computerized production is also viable, whose carrier can be film, video tape, disk, hardware or other digital removable disk storage device. To ensure the image correctness projected onto the screen, the characteristic of projector optical lens should be got acquainted. It is extraordinarily costly to realize the rendering by setting up lens analogue and material character in computer as every extra wide angle lens has very complicated characteristics of analogue and material character. Otherwise the image is very limited if projection is done with actually shot image.

Figure 12:
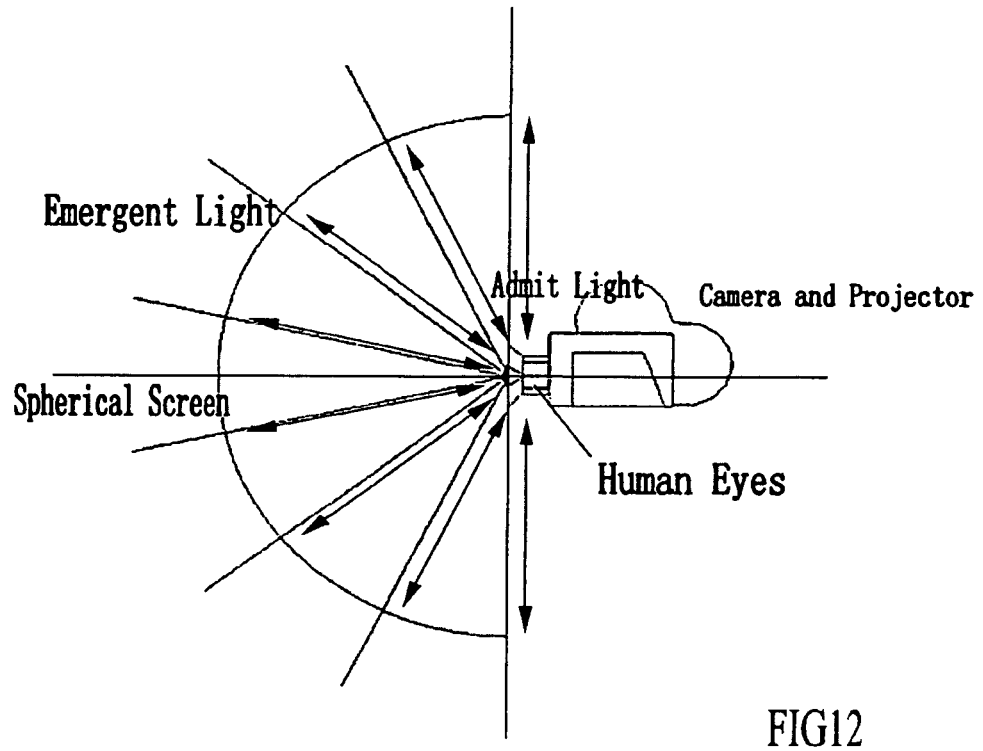
FIG. 12 is a side elevation of optical path of spherical screen.
Figure 13:
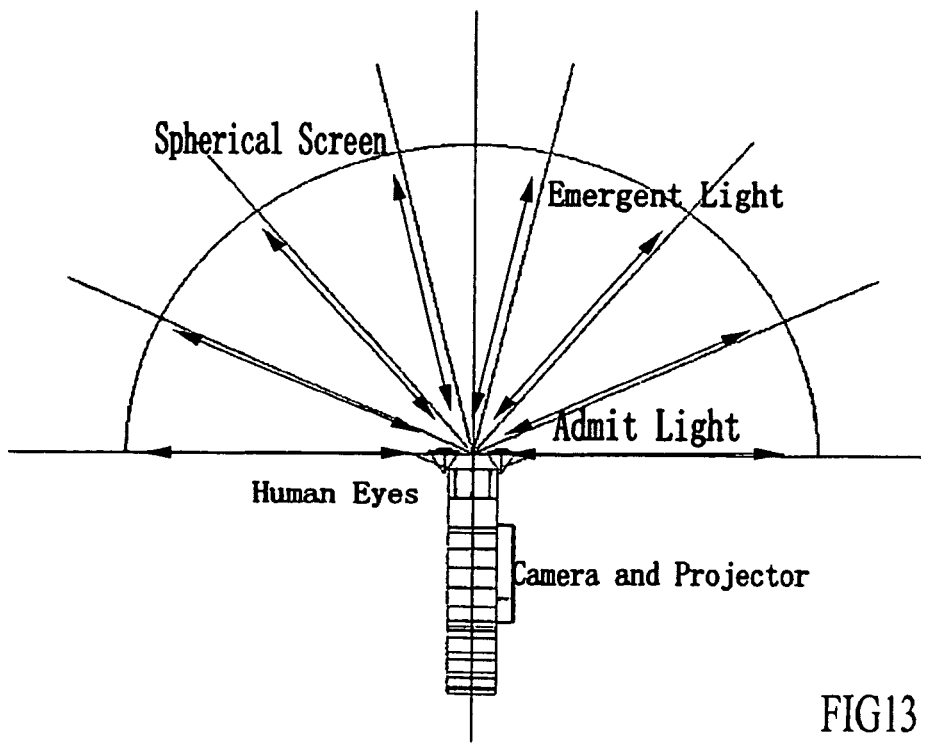
FIG. 13 is a plane view of optical path of spherical screen.
Figure 14:
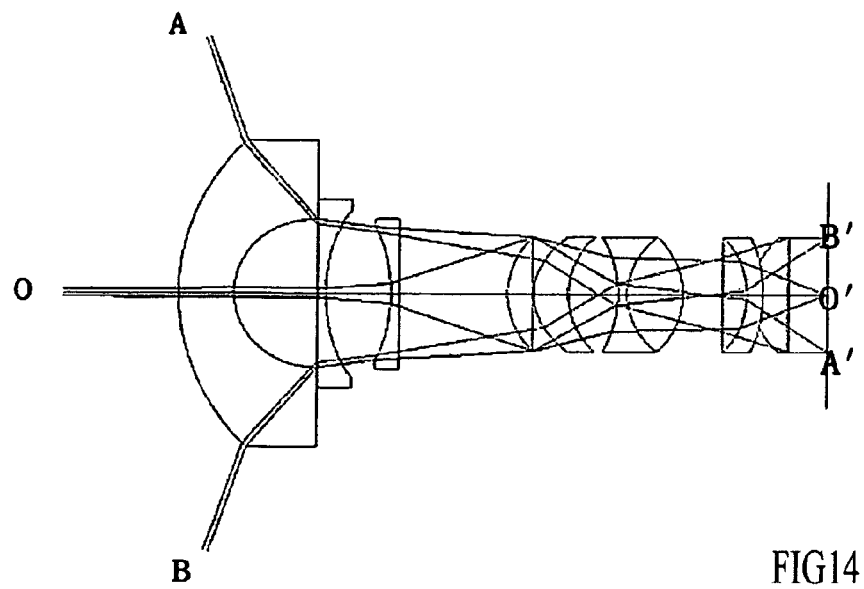
FIG. 14 is a schematic diagram of optical lens model used for spherical screen system.

The preferred embodiment of the invention is to record the scene viewed from audience eyes' location, viewing field and viewing angle, and then project to one section of spherical surface with eyes as center of the circle. When watching from effective position, audience can feel the viewed scene restored. Optical paths of spherical screen model is as shown on FIGS. 12 & 13, the indicated camera lens should be provided with extra wide angle ranging 0-160°, characterized with viewing field continuously and evenly distributed. The projector lens should be especially designed optical type, with extra wide angle lens made by any manufacturer in the world, similar with the model as indicated on FIG. 14, both are center system of spherical surfaces.

Figure 15:
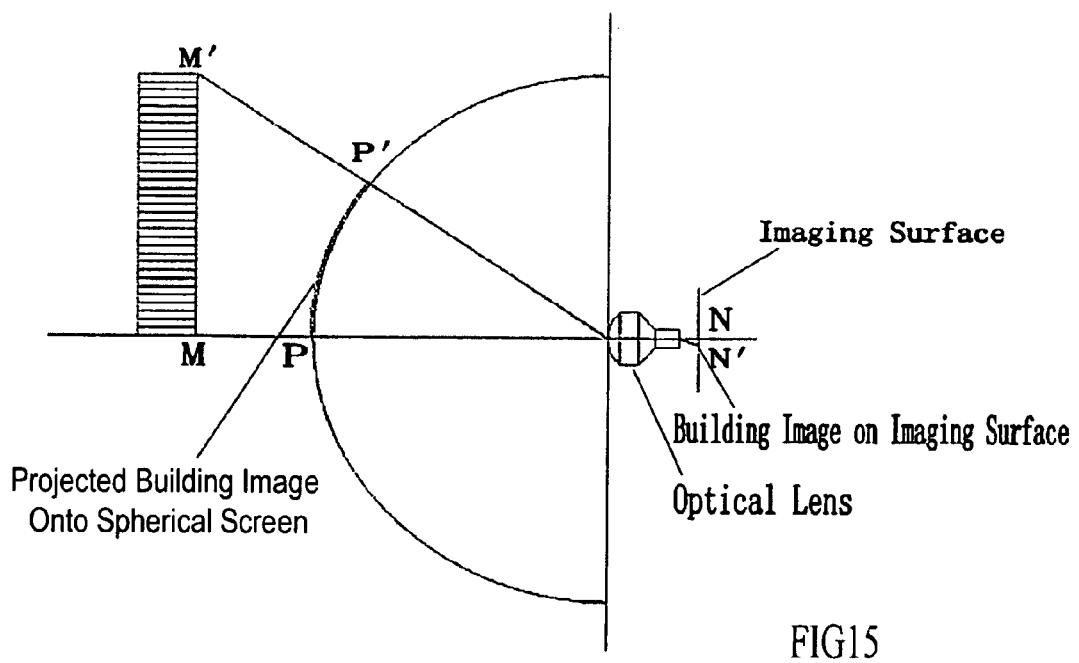
FIG. 15 is a schematic diagram of spherical screen, optical lens and image system.

FIG. 15 gives the detailed description on relation of spherical screen, optical lens, imaging surface, definite object and object on imaging surface. It goes in two steps: firstly, without spherical screen, real image N'N is produced image of edifice M'M on imaging surface transiting optical lens; secondly, laying a spherical surface in front of optical lens, an image PT will be produced when real image N'N is projected onto the spherical surface. When observer watches image PT in front of the lens, he could sense the true building M'M, this is because the height of viewing field direction, viewing angle and observing point are certified to be highly uniform, as well the perspective relation is certified to be correct. Some data can be obtained through analysis on the experimental shot real image, which are taken as design reference of digital optical lens.

Figure 16:
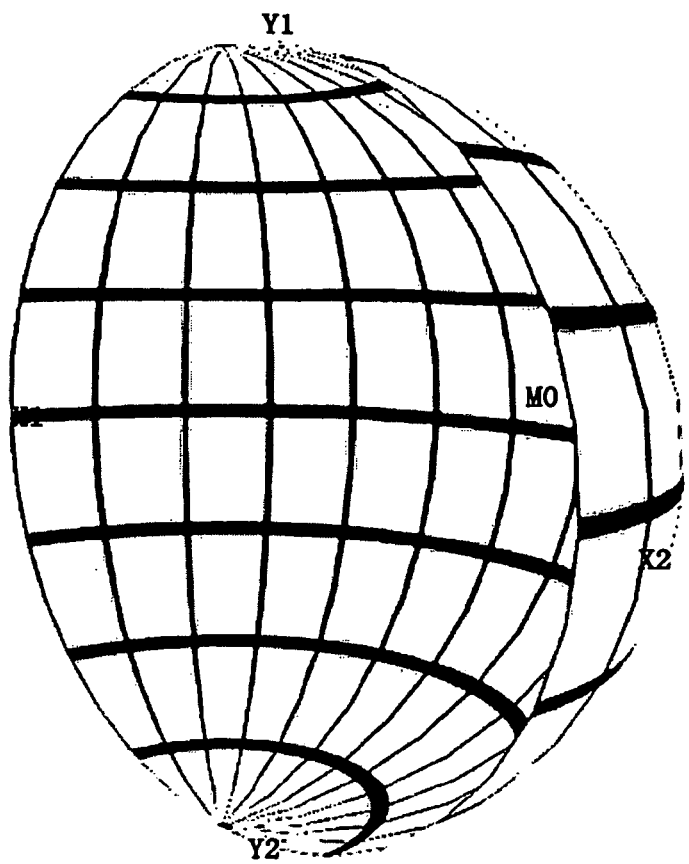
FIG. 16 is a schematic diagram of anchor point of spherical surface.
Figure 17:
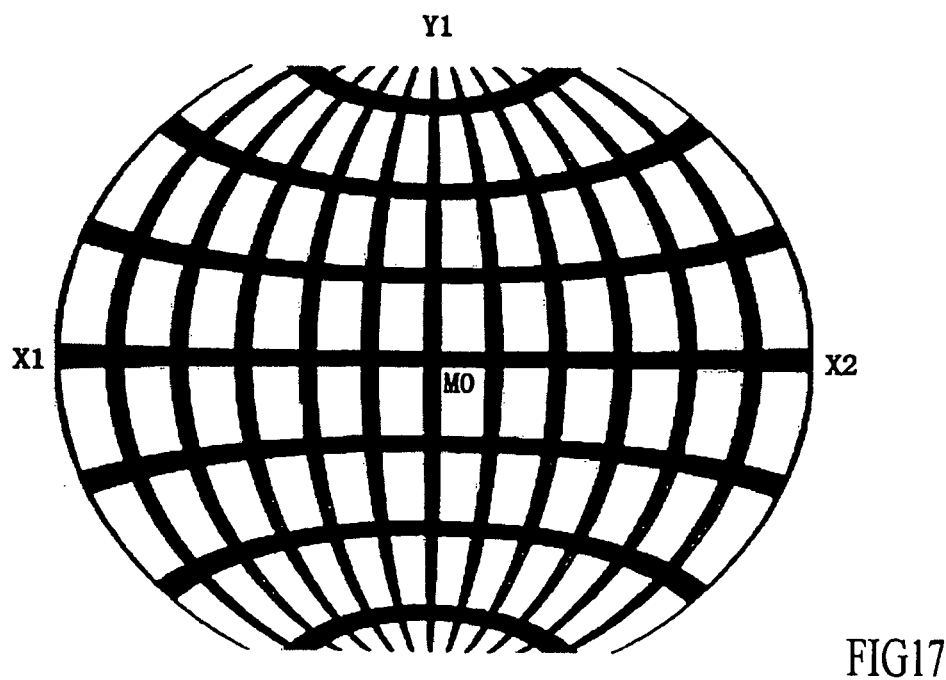
FIG. 17 is a schematic diagram of spherical surface imaging through optical lens.
Figure 18:
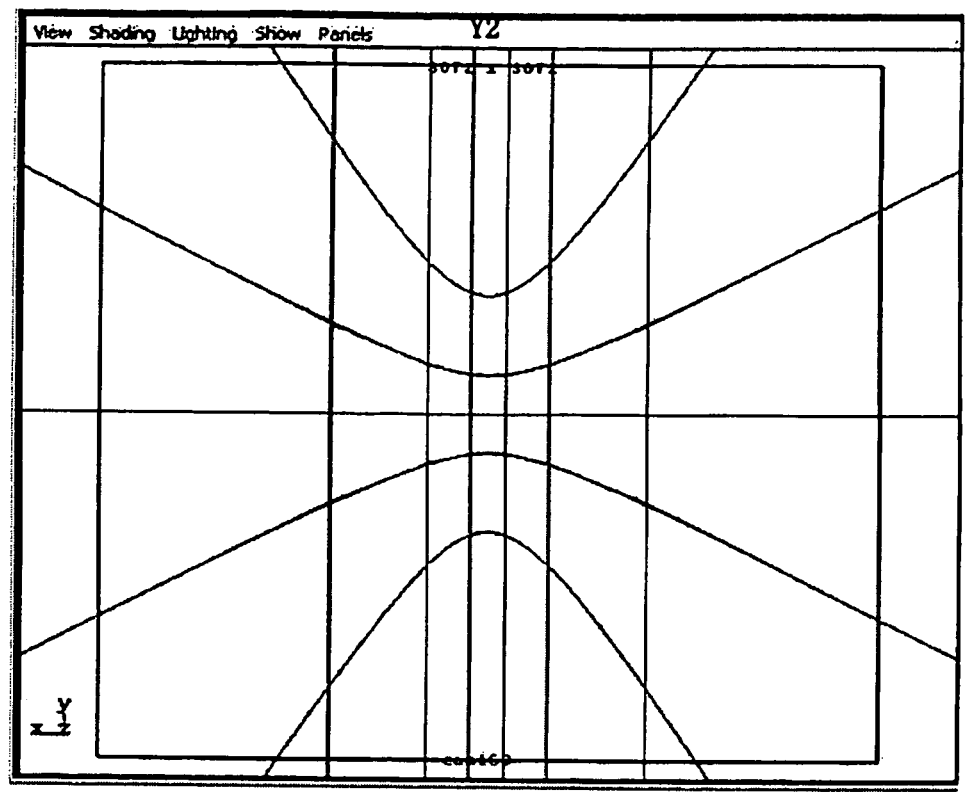
FIG. 18 is a schematic diagram of spherical surface imaging through common digital lens.

Mark an anchor point on spherical surface as shown on FIG. 15. Define the anchor point in this way: divide longitude and parallel into n parts, the intersection points of the divided parts as shown on FIG. 16 are the marked anchor points. Shoot the real image of the spherical surface formed on the imaging surface with the system shown on FIG. 15. As shown on FIG. 17, the one in use is extra wide angle optical lens 163° and 17 mm, many marked anchor points are clearly indicated. If the shot real image is projected back onto the screen, they will be correspondingly superposed with the marked anchor points one by one. Set common digital camera with same parameter as extra wide angle optical lens, namely 163°, set model in computer as shown on FIG. 15, spherical surface production and marked anchor point as shown on FIG. 16, when common digital camera takes place of optical lens and imaging surface as shown on FIG. 15, the image produced hereby from the rendering as shown on FIG. 18, is obviously different from that by optical lens. The imaging character of special optical lens as analyzed on FIG. 17 shows that it is impossible for any practically applied special extra wide angle lens to reach 180°, because 180° represent infinity viewpoint in horizontal or vertical direction and fails to be imageable on imaging surface. But X1, X2, MO, Y1 and Y2 on FIG. 17 can infinitely reach the infinity in horizontal, front and vertical direction, that is X1-M0-X2 represent an infinite line along horizontal direction, Y1-M0-Y2 is an infinite line along vertical direction.

As indicated on FIG. 17, the rendered image on imaging surface of marked anchor point on spherical surface is evenly distributed on a circular surface, the center of the circle, the center of the sphere and the center of special optical lens are completed superposed, which predicates that the viewing field of front hemisphere, with center of lens as origin, is evenly divided, approaching schemed perfect image. If certain object located within the hemisphere in front of lens, and kept a certain distance from lens center line, its image may obtain an image about its same size on imaging surface, free of picture distortion.

The imaging character of common digital extra wide angle lens as shown on FIG. 18: the closer to the viewing field direction perpendicular to lens center line, the more distorted of the image. Its deficiency is that the object has a smaller effective imaging area near lens center line. As the important viewing area, the small area fails to support sufficient image resolution.

Figure 19:
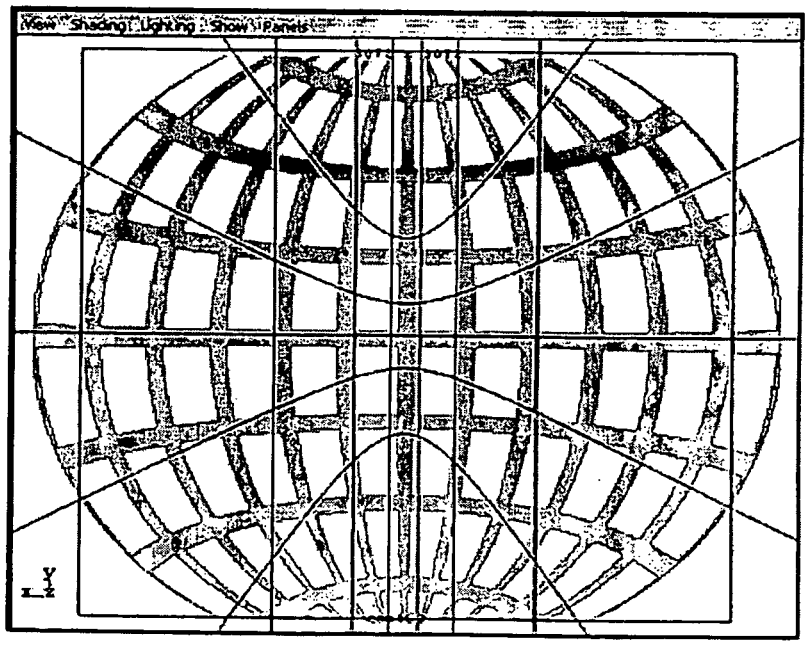
FIG. 19 is an imaging comparison diagram of through optical lens and common digital lens.

FIG. 19 is the imaging contrast by adopting optical lens and common digital lens. Image produced through common lens will lead to picture distortion. One purpose of this invention is to create a simplified digital lens model provided with the same optical character as special optical lens, therefore calculated amount is accordingly reduced, rendering cost is lowered down as well. The detailed solution will be mentioned in the following introduction.

Figure 9:
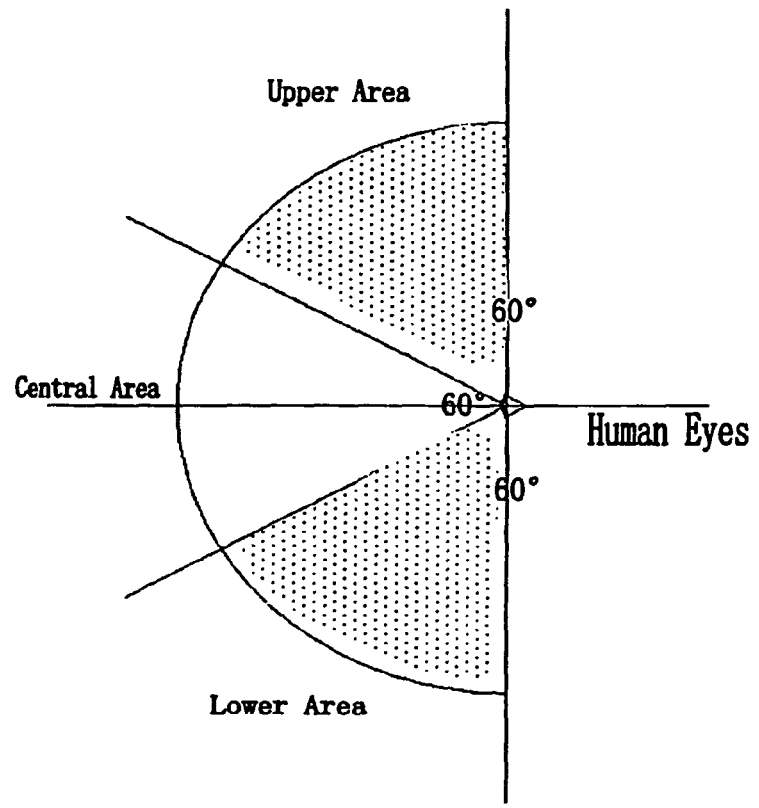
FIG. 9 is a side elevation of simplified digital model for spherical screen calculation.
Figure 10:
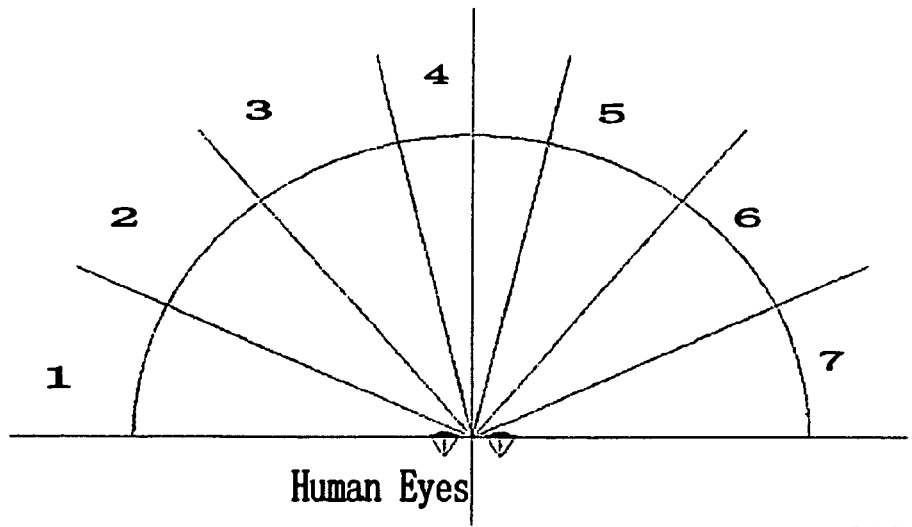
FIG. 10 is a plane view of simplified digital model for spherical screen calculation.
Figure 11:
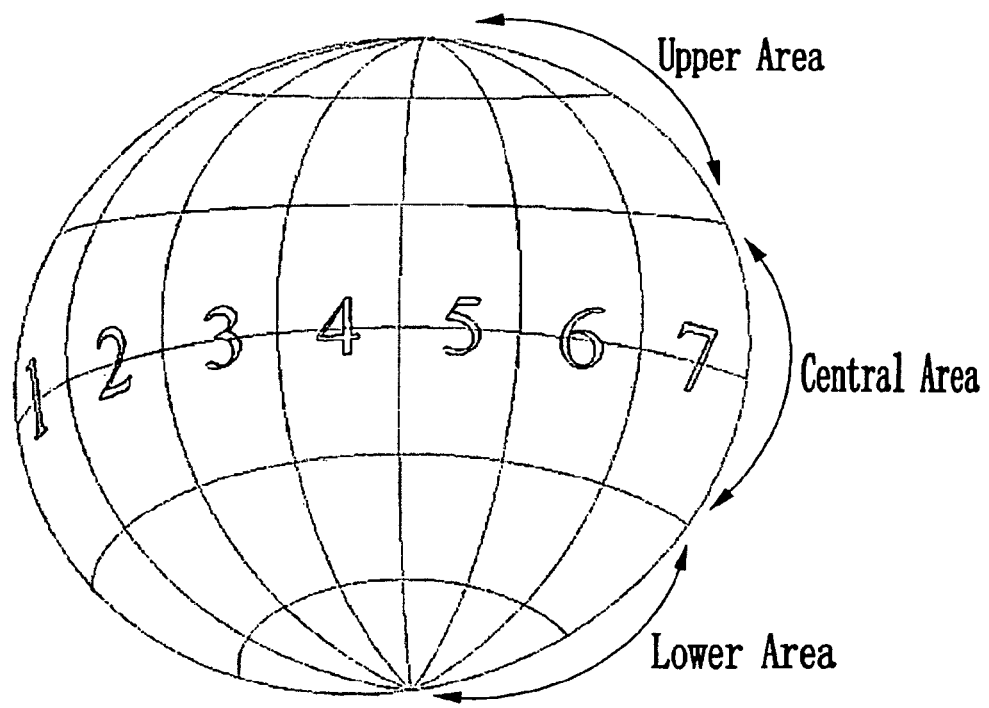
FIG. 11 is a perspective of simplified digital model for spherical screen calculation.

As indicated on FIG. 9, as human eyes are at the same level, camera with field angle 60° can realize true reflection of human eye perspective. Thus view field ranging 0-180° up and down is divided into 3 parts, each of which is 60°. The effect when human eyes look around the scene can be simply simulated with 3 cameras with field angle 60. Due to pupillary distance 55 mm-74 mm, when looking around scene ranging 0-180°, continuous parallax variation will be engendered, that is, the viewing scene is slightly different from each eye. Jump of viewed image through human eyes projected by camera is uncomfortable. Therefore in consideration of the best viewing field, taking larger value at 20° position, the horizontal continuous viewing field ranging 0-180° is simulated in 7 viewing directions, the minimum quantity of view field continuity as shown on FIG. 10. The consecutive viewing direction in front of audience ranging 0-180° is simulated in 7 horizontal and 3 vertical viewing directions, totally 3×7=21 directions, so that image jump cannot be felt, in the mean time viewing field integral model is greatly simplified, as shown on FIG. 11.

The said digital lens model of invention is not common type, but an algorithm model composition of many computer graphs, which is more like a rendering image algorithm. The final imaging effect is almost the same with imaging effect of the specified extra wide angle optical lens mentioned in the invention. The said digital lens model in the graphics software can be represented as two rendering model. The first model is to simulate image of hemispherical scene ranging 0-180° in front of human eye; the second model is to correspondingly project images series shot by the first one to a special calculated curved surface. The imaged obtained when the curved surface is perpendicularly rendered is almost similar to that projected by special optical lens.

Figure 20:
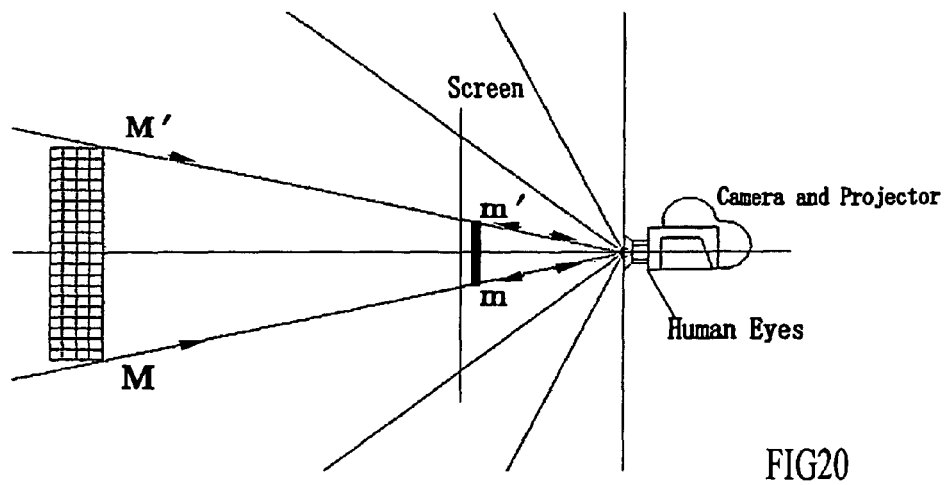
FIG. 20 is a schematic diagram of reversibility principle of optical paths.

The following is emphasized on elaboration of digital lens model of the invention: first goes with reversibility of optical paths. As shown on FIG. 20, either three centers and center lines of human eyes, camera and projector are superposed. When two radials sent by object M'M in front of human eyes are shot and then projected by projector with same angle, putting a screen on optical paths at this time, an image m'm cast onto the screen by projector, which superposes with M'M observed from human eyes. If it is plane image, human eyes will verdict the object distance through perspective. When it comes to 3d image, human eyes will position the object precisely, which is so called reversibility of optical paths.

Figure 21:
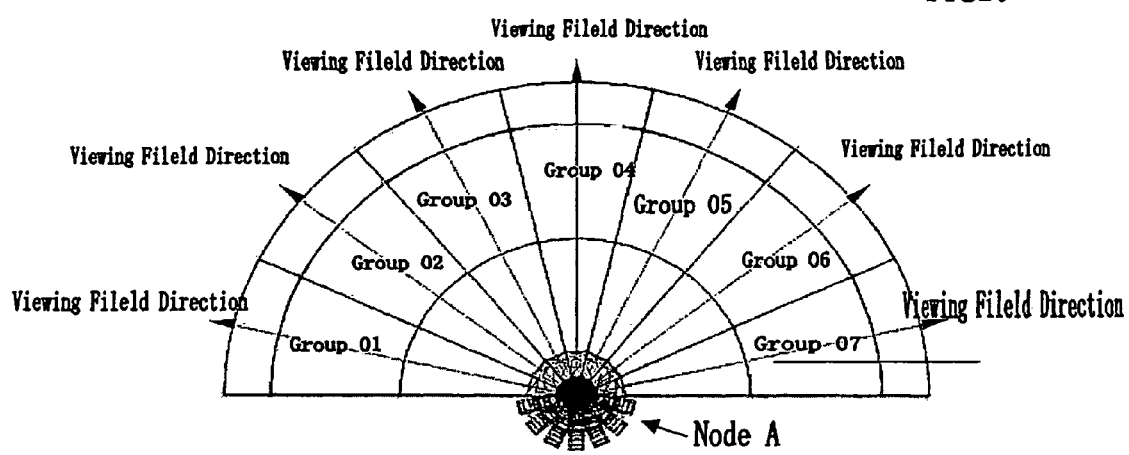
FIG. 21 is a plane view of computer rendering overall model
Figure 21:
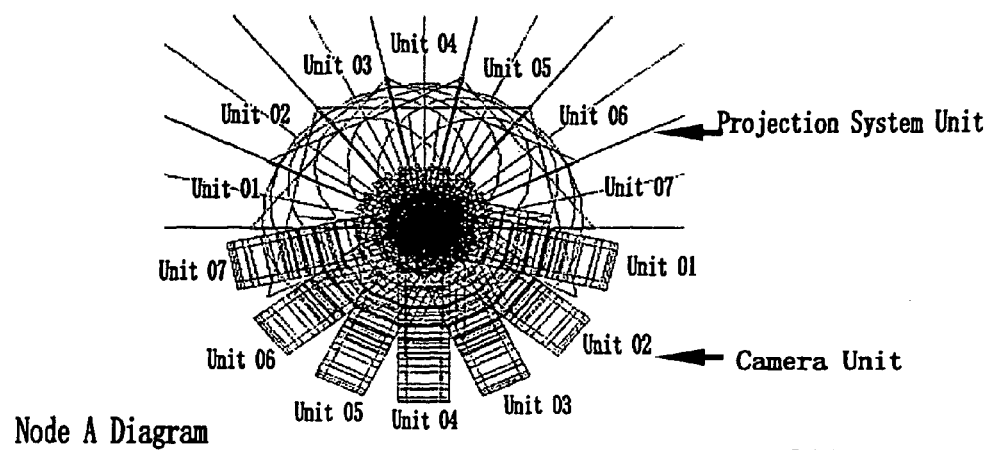
Figure 22:
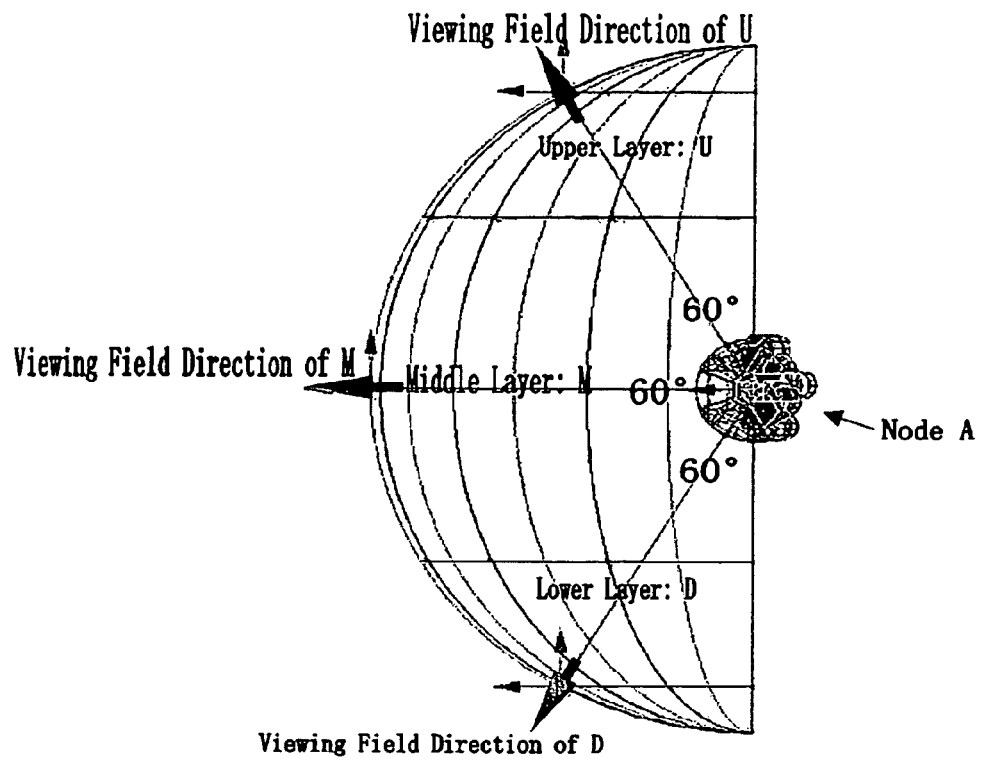
FIG. 22 is a side elevation of computer rendering overall model
Figure 22:
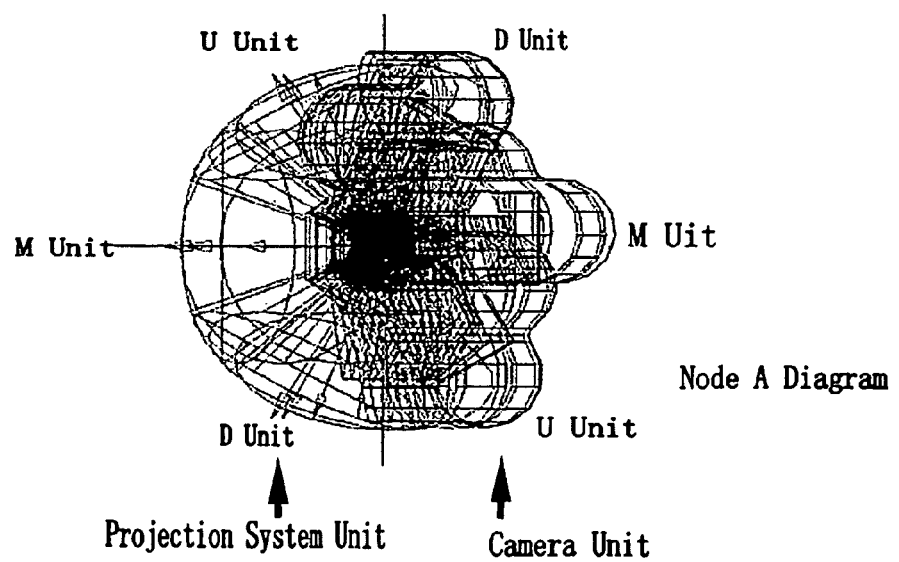
Figure 23:
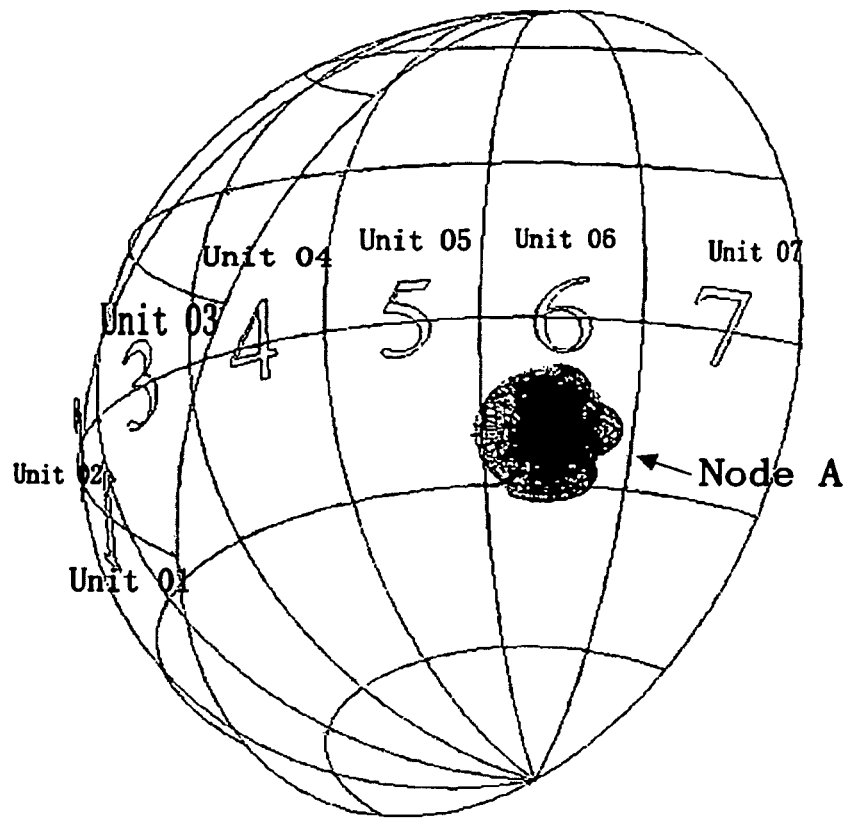
FIG. 23 is a perspective of overall model rendering.
Figure 23:
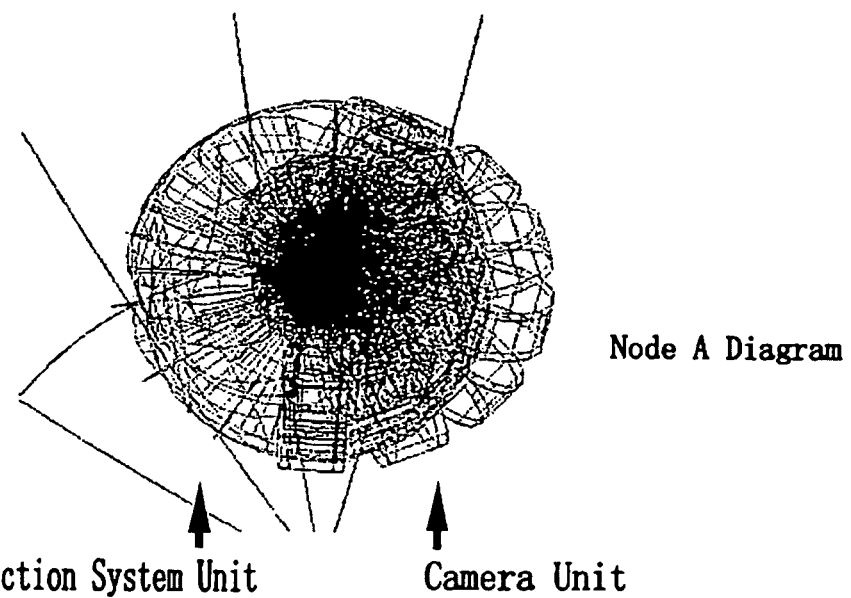
Figure 24:
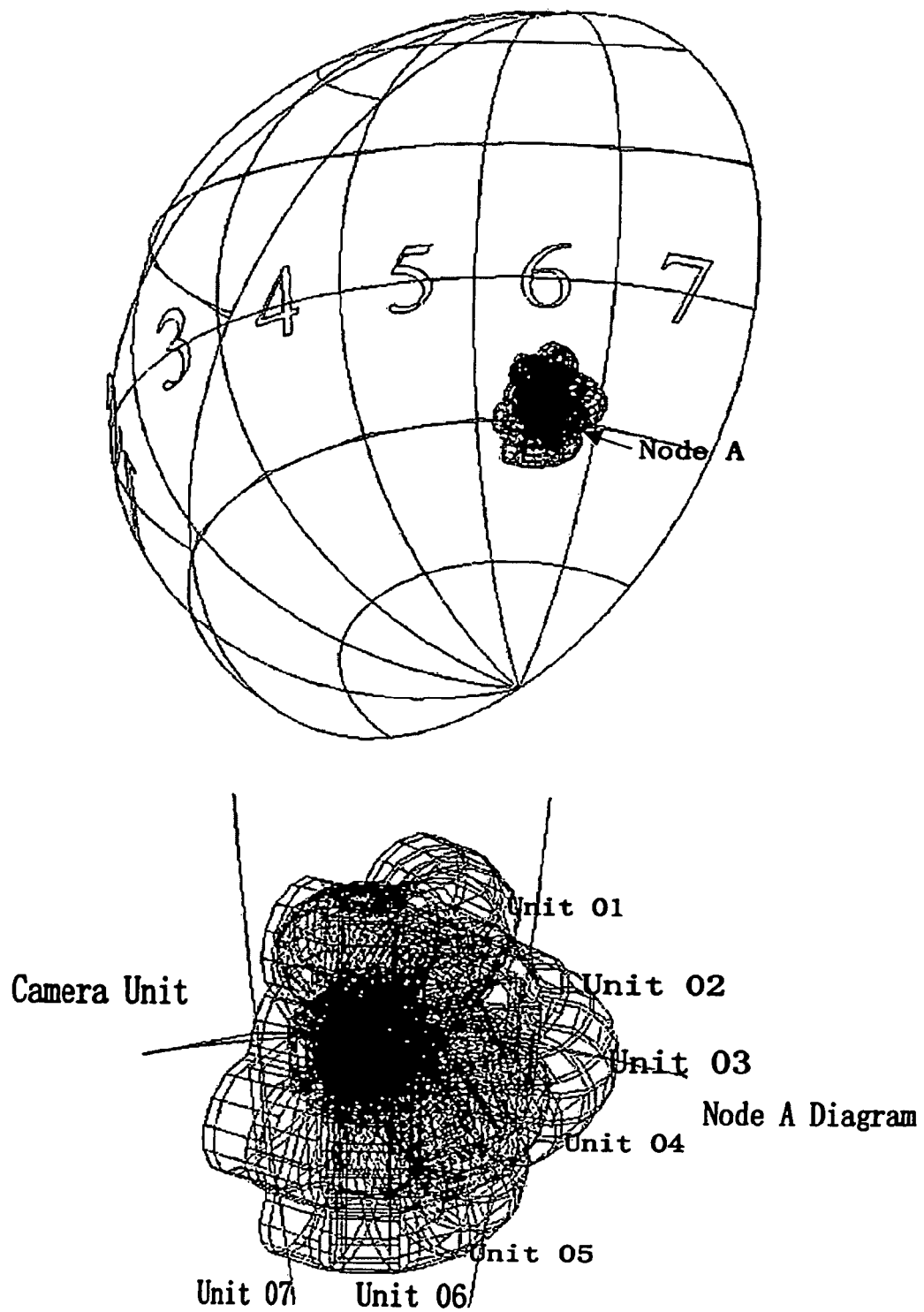
FIG. 24 is a systematic overview of computer rendering image system.

The most important part of the invention is two rendering models described above. As indicated on FIGS. 21, 22 and 23, the systematic general diagram includes two rendering models, image system rendering model and projection system rendering model. Either image system or projection system, each includes three layers cameras or projectors, each layer has 7 cameras or projectors, that is to say, the whole rendering model comprises 21 cameras and 21 projectors, each of which is identical in viewing field direction and every center of which superposes at center of hemispherical surface. Camera unit and projector unit can be taken as two units same in parameter, but completely reversible in beam radiation. Camera and projector together complete light energy transfer in reciprocal way by receiving and projecting radial. Their parameters are as follows: horizontal view field angle: 180°-÷-7=25.7142857°; vertical view field angle: 60°; the three layers is indicated with u, m, d; horizontal 7 directions are indicated with 01, 02, 03, 04, 05, 06 and 07, camera is C, projector is P, they relates as follows:

FIG. 23 is general perspective drawing of computer rendering model. The image system rendering model and projection system rendering model will be expounded separately. What image system rendering model do is to simulate hemispherical area scene when human eyes look around in the front ranging 0-180°, rendering the viewed image in 21 viewing field directions, continuity simulating of viewing field variation. FIG. 24 indicates general diagram of computer rendering image system.

Figure 25:
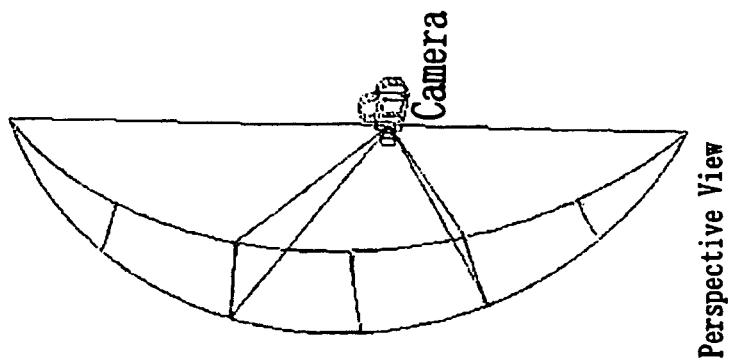
FIG. 25 is a schematic diagram of one of the 7 cells when spherical surface intersected along meridian
Figure 25:
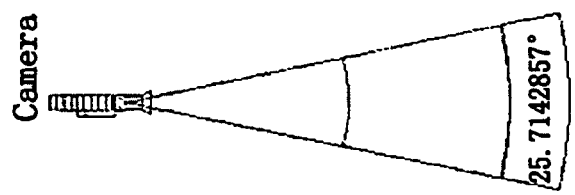
Figure 25:
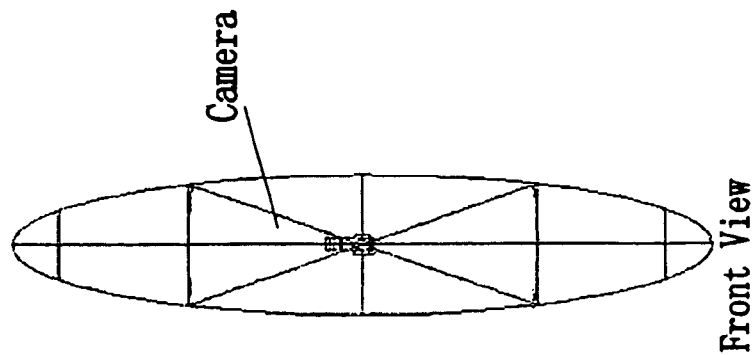
Figure 26:
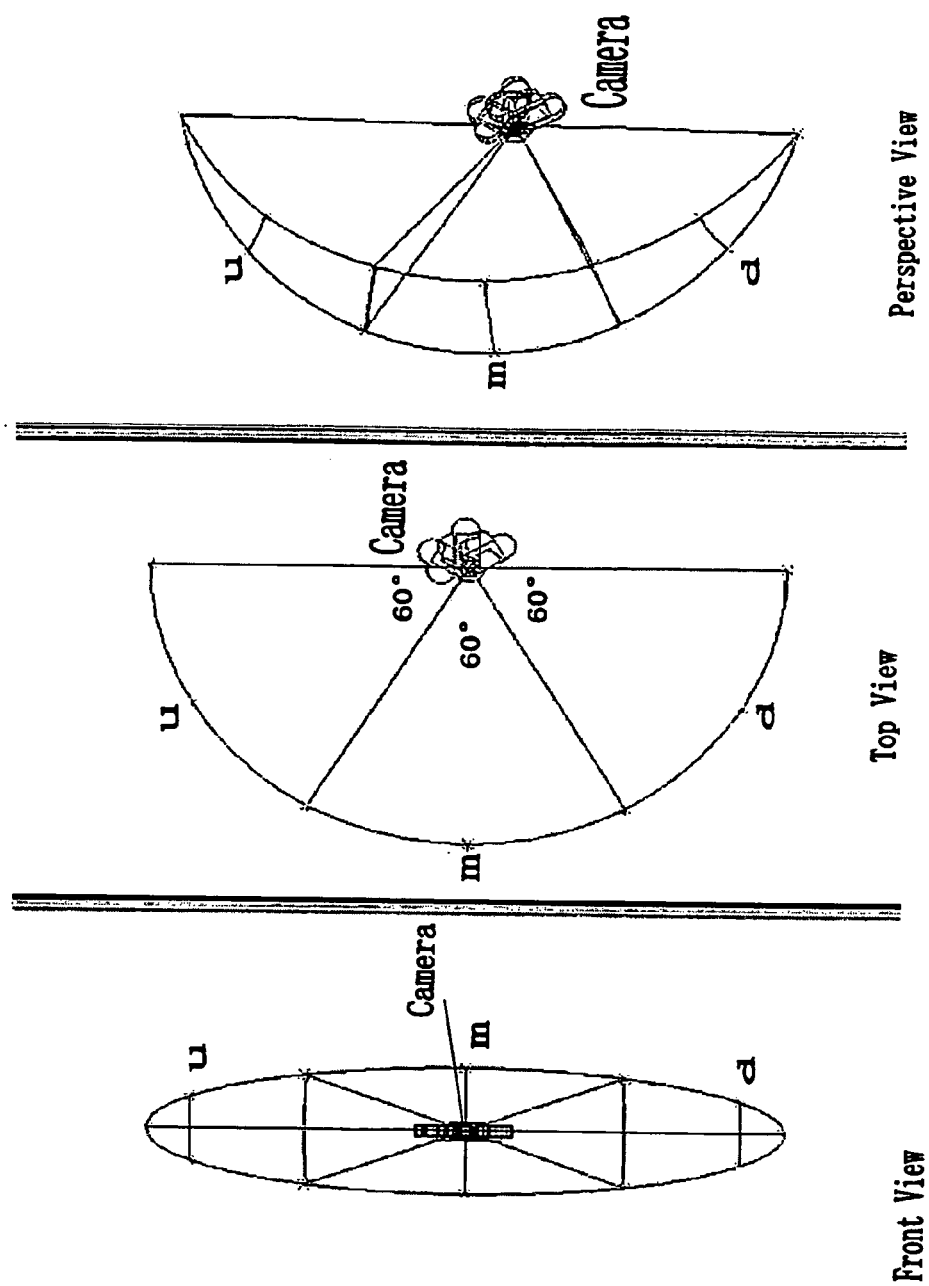
FIG. 26 is a schematic diagram of three cases when spherical surface intersected along meridian.

FIG. 25 indicates one of the 7 units intersected along longitude direction with center of the sphere as the center, mainly one unit of intersected view field in vertical direction, which is composed of 3 cameras. FIG. 26 indicates three types of intersection along parallel direction, vertical 180° area is divided into parts of u, m and d, vertical view field angle of each is 60°, 25.7142857° in horizontal.

Figure 27:
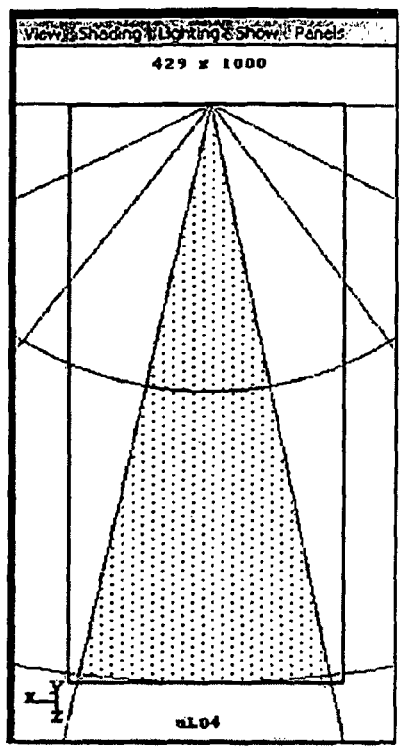
FIG. 27 is a schematic diagram of rendering image of spherical surface u unit in computer.
Figure 28:
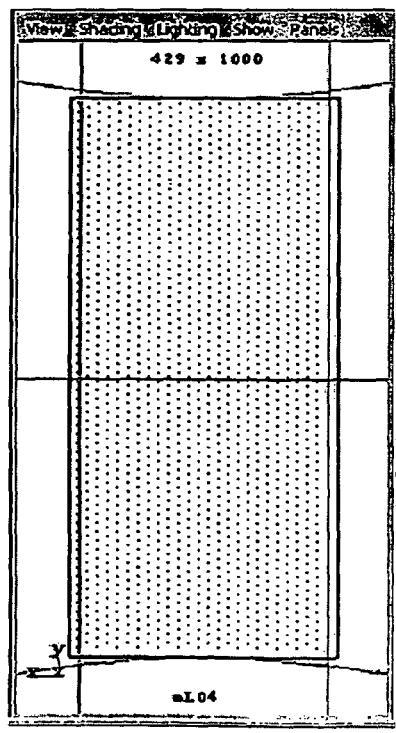
FIG. 28 is a schematic diagram of rendering image of spherical surface m unit in computer.
Figure 29:
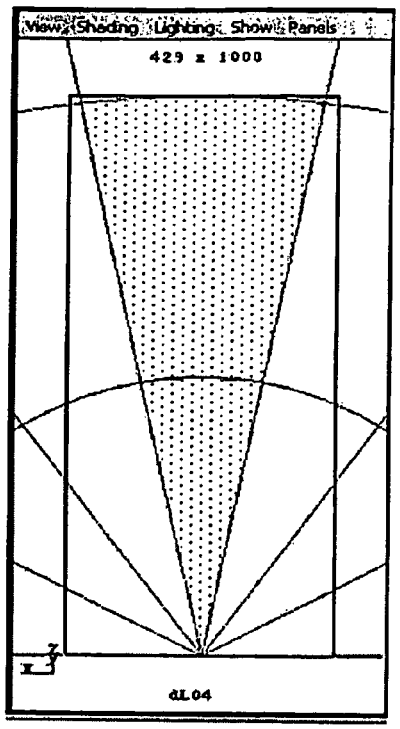
FIG. 29 is a schematic diagram of rendering image of spherical surface d unit in computer.

FIGS. 27, 28 and 29 indicates image of upper, middle and lower part of spherical surface rendered by digital camera, amongst of which the shadowed part is the effective rendered coverage, 0 point is viewing field center. As computer graphics software can only rendering plane image, only the mapping of the sphere onto the plane surface can be rendered. The rendered image is very similar with that viewed by human eyes. The vertical viewing field angle is 60°, 25.7142857° in horizontal. The proportion of image width and height:width:height=25.7142857:60=0.428571:1

Ratio of height and width in computer graphics software is indicated with resolution. So rendering image resolution of u, m and d should be 429×1000 or its multiple, for instance: n (429×1000), n as multiple coefficient. Computer rendering image system can produce as much as 21 images (7 images in each of upper, middle and lower layers) by simulating viewed effect of human eyes. The all produced image satisfying n 429×1000), one-to-one corresponding to projector.

What projection system rendering model to do is to project rendered images produced by image system onto spherical surface one-to-one correspondingly, and optical paths revers-

| Upper layer | Camera No. | Cu01 | Cu02 | Cu03 | Cu04 | Cu05 | Cu06 | Cu07 |
|---|---|---|---|---|---|---|---|---|
| | Projector No. | Pu01 | Pu02 | Pu03 | Pu04 | Pu05 | Pu06 | Pu07 |
| Middle layer | Camera No. | Cm01 | Cm02 | Cm03. | Cm04 | Cm05 | Cm06 | Cm07 |
| | Projector No. | Pm01 | Pm02 | Pm03 | Pm04 | Pm05 | Pm06 | Pm07 |
| Lower layer | Camera No. | Cd01 | Cd02 | Cd03 | Cd04 | Cd05 | Cd06 | Cd07 |
| | Projector No. | Pd01 | Pd02 | Pd03 | Pd04 | Pd05 | Pd06 | Pd07 |

Projector with 01 postfix in the three layers is defined as Group 01, those with 02 is defined as Group 02 ... 7 groups altogether from 01-07. Vertical view field of layer u, m and d is as shown on FIG. 22: u is +60, m is 0°, d is −60°. Horizontal viewing field direction of group 01-07 are as shown on FIG. 21:

ibility should be assured, that is, the image should be seamed in perfection by projection system onto spherical surface.

Figure 30:
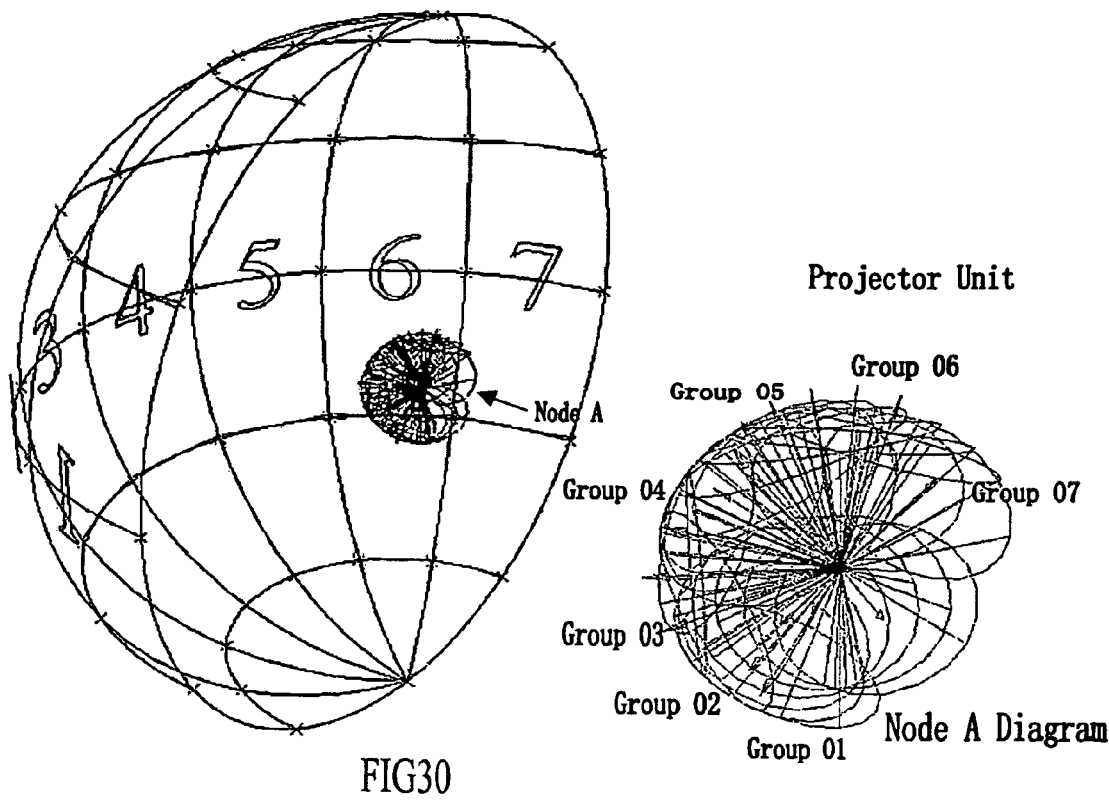
FIG. 30 is a systematic overview of computer rendering projection system.
Figure 31:
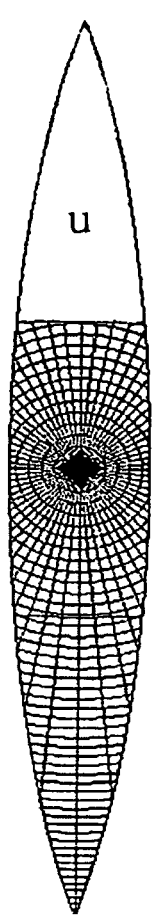
FIG. 31 is a diagram of projected range onto spherical surface of u unit.
Figure 32:
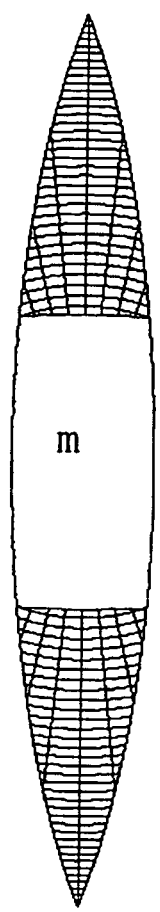
FIG. 32 is a diagram of projected range onto spherical surface of m unit.
Figure 33:
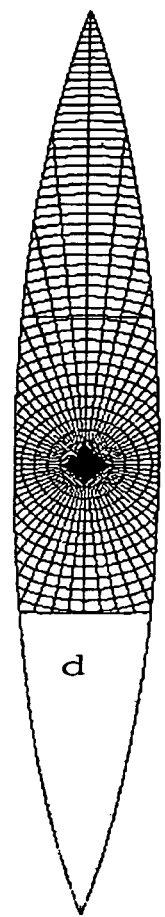
FIG. 33 is a diagram of projected range onto spherical surface of d unit.

FIG. 30 is general diagram of projection system rendering model, as indicated projection unit are one-to-one corresponding to imaging units of image system. u, m and d image rendered by image system as shown on FIGS. 31, 32 and 33,

| Group | 01 | 02 | 03 | 04 | 05 | 06 | 07 |
|---|---|---|---|---|---|---|---|
| Horizontal viewing field direction | 12.8571° | 38.5714° | 64.2857° | 90° | 115.7143° | 141.4286° | 167.1429° | are projected to the corresponding area on curved surface through projection system. To ensure the reversibility of optical paths, projection unit of projection system should be provided with following optical characters: vertical view field angle=60 horizontal view field angle=25.7142857°, only under this condition, can the projection units of projection system be regarded reversible with imaging unit of image system, and this reversibility is the key point of the invention. The cited optical character is just a preferred embodiment.

Figure 34:
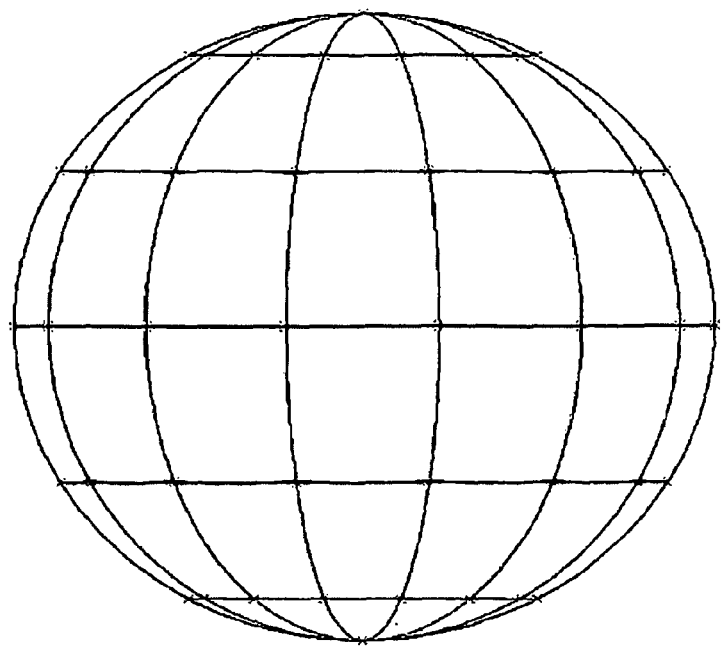
FIG. 34 is a schematic diagram of hemispherical orthogonal rendering.

FIG. 34 indicated the orthogonal rendered image of a hemisphere in computer graphics software, which is a synthetic image rendered by 21 digital camera lenses. Obviously the picture is deformed, the middle stretched, two sides compressed, as shown on FIG. 17, which is different from the symmetrical graphics obtained through optical lens. What the invention to solve is to restore image, which enable the image rendered through digital lens to be the same as that through optical lens. The invention fabricate a curved surface, on which image of spherical surface is perfectly projected, the obtained image in the curved surface being orthogonal rendered is the same as that through optical lens.

Figure 35:
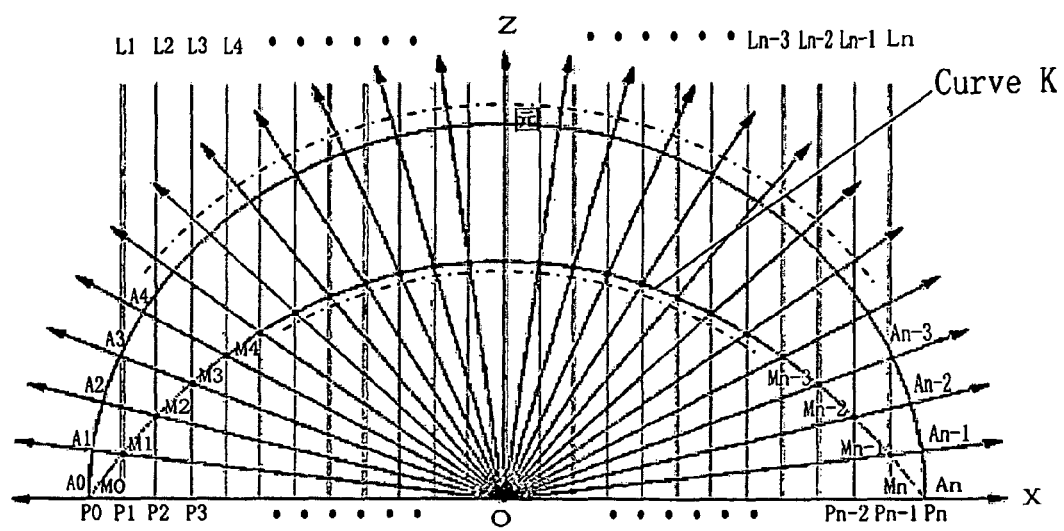
FIG. 35 is the mathematical model of digital optical lens.

FIG. 35 indicates how to make the curved surface in computer graphics software. Divide viewing field horizontal range 0-180° into n parts, indicated with ° A1-0An, as shown on FIG. 35. Divide spherical diameter evenly into n parts as PO, P1, P2 . . . Pn−1, Pn, make n parallels paralleled to OZ axis as L1, L2, L3 . . . Ln−1, Ln, which represent orthogonal view field distribution. Determine in turn intersection point M1 between OA' and L1, M2 between 0A2 and L2, M3 between 0A3 and L3 . . . Mn−1 between 0An−1 and Ln−1, Mn between 0An and Ln, join M0, M1, M2 . . . Mn−1 and Mn, to get a curved line, as shown on FIG. 35, which is called curve K.

Curve K is not a focal conic due to without focus. Intersection point M0, M1, M2 . . . Mn−1, Mn, made when curve K intersected by n radials namely OAO, 0A1, 0A2 . . . 0An−1, 0An sent from 0 point, is actually projection of n radials by dividing 0-180° horizontal view field. When projection MO, M1, M2 . . . Mn−1, Mn is orthogonally cast onto semicircle diameter, point mapping is acquired as P0, P1, P2 . . . Pn−1, Pn, which divide the diameter into n parts. Therefore horizontal 0-180° viewing field can be divided onto a horizontal line. Rotate curve K around OZ axis as shown on FIG. 35, a curved surface B, namely rendering surface will be engendered, as shown on FIG. 36. The curved surface is characterized as follows: when projection system project radial onto the surface, if orthogonally rendered, an image will be obtained similar with the one when hemispherical surface is rendered through specified optical lens, that is to say, optical paths reciprocal conversion is completely realized.

Figure 36:
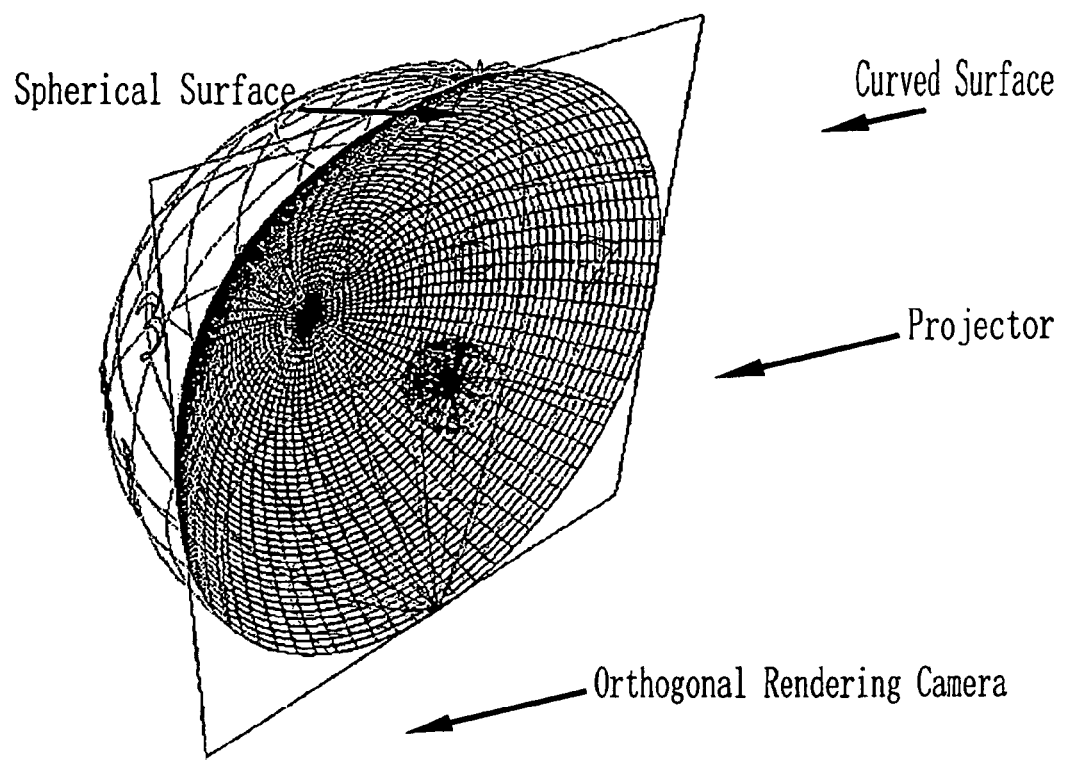
FIG. 36 is the rendering model of digital optical lens.

FIG. 36 indicates the final rendering model through digital optical lens. Camera resolution is set to be 4096×3592 at orthogonal rendering. The calculation of which is relative to projecting equipment of 70 mm and 10 apertures, which is the preferred embodiment of the invention.

In consideration of further cost reduction, part numbers of horizontal viewing field can be small, to the minimum 3 parts, another optional embodiment of the invention: by adoption of 3 viewing field directions either in horizontal or vertical, that is 3×3=9 viewing field direction, to simulate continuous viewing field direction ranging 0-180° in front of audience. The image system rendering model corresponding of the embodiment includes three layers of cameras, each layer of which include 3 cameras. The projection system rendering model is one to one correspond with the image system rendering modem. The projection system rendering model also includes three layers of projectors, each layer of which include 3 projectors. The viewing direction of both projectors and cameras are consistent, centers completely superposed, optical paths reversible. Horizontal view field of 01-03 are as follows:

| Group | 01 | 02 | 03 |
| --- | --- | --- | --- |
| Horizontal viewing field direction | 30° | 90° | 150° |

The simplified method above will produce some image jump, but which is acceptable basically and lower the rendering cost.

The inner side of spherical screen adopts special metal reflecting material, internal surface is evenly sprayed to ensure even reflection.

The technique and equipment concerning this invention can be widely applied to film industry, which can either be recorded in simulation mode or digital ways, as well, they are applicable to 3D production.

The invention involves many other embodiments, rendering surface as part of curved surface B, projection screen as part of spherical surface, view field angle of rendering surface and projection screen are consistent.

As for image system rendering model composed of common digital lens, the rendered image turn to be distorted, the engendered distortion is restored by keeping rendering surface unchanged (as curved surface B, or part of curved surface B), the projection screen is at the rear side of rendering surface viewing field direction, viewing field direction and angle of rendering surface is consistent with that of projection screen. Subjected to the above said conditions, the invention can be applied in some other ways, for example, projection screen can be hemispherical surface or part of it, rendering surface is part of curved surface B. Projection screen can be plane, combination of plane and curved surface, random curved surface or part of it; rendering surface can also be spherical surface, conicoid or part of it.

No matter it is image system or projection system, arrangement as follows are also available: up-down M layer cameras or projectors, each layer contains N cameras or projectors, that is to say, the whole rendering model may include M×N cameras and M×N projectors, M and N can be any positive integer.

What is claimed is:

1. A curved film projection method, comprising following steps:
   (a) the rendering model of image system rendering the real scene;
   (b) the rendering model of projection system rendering the projection of image rendered by the image system rendering model on the rendering surface; and
   (c) the projecting device projecting the finally rendered image of the rendering model of projection system onto the projection screen via the optical lens.

2. The curved film projection method as defined in claim 1, wherein the rendering as mentioned in above step (b) adopts orthogonal rendering.

3. A curved film projection system, comprising:
   a rendering surface;
   a projection screen; a real scene rendering model of image system;

a rendering model of projection system that renders the projection the image rendered by the rendering model of image system on the rendering surface; and a projecting device that projects the image finally rendered by the rendering model of projection system onto the projection screen through optical lens, wherein said projection screen is regarded as a first surface or part of said first surface, wherein said rendering surface is regarded as a second surface or part of said second surface, wherein first surface is behind said second surface, and watching from observer's eyes to projection screen, wherein a viewing direction and angle from observer's eyes to the rendering surface is consistent with that to said projection screen, wherein a viewing direction and angle from observer's eyes to said rendering surface is consistent with that to said screen, wherein said image system rendering model is reversible with said projection system model, wherein said rendered real scene by said projection system rendering model is projected to said second surface and then to said projection screen through said projecting device, exactly restore the distorted image produced by the image system rendering model, wherein said image system rendering model comprises up-and-down M-layer digital cameras and each layer contains N cameras.

4. The curved film projection system as defined in claim 3, wherein the rendering models of both image system and projection system respectively comprise cameras and projectors, the view directions of which are consistent, two centers coincide, but the optical paths are reversible.

5. The curved film projection system as defined in claim 4, wherein said M is 3, the said N is 7, the said image system rendering model contains 21 single digital cameras.

6. The curved film projection system as defined in claim 5, wherein angle of the horizontal view field of each digital camera is 25.7142857°, and the angle of vertical view field is 60°, wherein a viewing direction of all digital cameras follows the same direction as that of the divided viewing field, wherein a horizontal viewing direction of each camera is 12.8571°, 38.5714°, 64.2857°, 90°, 115.7143°, 141.4286° and 167.1429° respectively.

7. The curved film projection system as defined in claim 4, wherein said M is 3, said N is 3, the said image system rendering model contains 9 digital cameras, wherein said angle of horizontal view field of each camera is 60°, wherein an angle of vertical view field is 60°, wherein a viewing direction of all digital cameras follow the direction of divided view field, wherein a horizontal viewing direction of each single digital camera in each layer is 30°, 90° and 150° respectively.

8. The curved film projection system as defined in claim 3, wherein the said projection system rendering model comprises upper and lower M-layer digital cameras, each layer of which contains N single digital projectors.

9. The curved film projection system as defined in claim 8, wherein the said M is 3, the said N is 7, the said projection system rendering model contains 21 single digital cameras.

10. The curved film projection system as defined in claim 3, wherein the said M is 3, the said N is 3, the said image system rendering model contains 9 digital cameras, wherein said angle of horizontal view field of each camera is 60°, wherein an angle of vertical view field is 60°, wherein a viewing direction of all digital cameras follow the direction of divided view field, wherein a horizontal viewing direction of each single digital camera in each layer is 30°, 90° and 150° respectively.

11. The curved film projection system as defined in claim 10, wherein the said first surface is a curved surface, a plane surface, or a combination of plane and curved surface.

12. The said curved film projection system as defined in claim 11, wherein the said second surface is one of spherical and conicoid.

13. A curved film projection method, comprising following steps:
(a) rendering model of image system rendering the real scene;
(b) rendering model of projection system rendering the projection of image rendered by the image system rendering model on the rendering surface; and
(c) projecting the finally rendered image of the rendering model of projection system by a projecting device onto an projection screen via an optical lens.

14. The curved film projection method as defined in claim 13, wherein the rendering as mentioned in above step (b) adopts orthogonal rendering.

* * * * *